(12) United States Patent
Abts et al.

(10) Patent No.: US 10,130,054 B2
(45) Date of Patent: *Nov. 20, 2018

(54) IRRIGATION SYSTEM WITH TRANSIENT STATE SPEEDS OF MOVEMENT

(71) Applicant: Irrovation LLC, Omaha, NE (US)

(72) Inventors: Gerald L. Abts, Denver, CO (US); Kevin J. Abts, Omaha, NE (US); Kim Jedlicka, Leigh, NE (US)

(73) Assignee: Irrovation LLC, Omaha, NE (US)

( * ) Notice: Subject to any disclaimer, the term of this patent is extended or adjusted under 35 U.S.C. 154(b) by 111 days.

This patent is subject to a terminal disclaimer.

(21) Appl. No.: 14/599,880

(22) Filed: Jan. 19, 2015

(65) Prior Publication Data

US 2015/0150200 A1    Jun. 4, 2015

Related U.S. Application Data

(63) Continuation-in-part of application No. 13/567,185, filed on Oct. 11, 2012, now abandoned.

(51) Int. Cl.
*B05B 3/18*    (2006.01)
*A01G 25/09*    (2006.01)

(52) U.S. Cl.
CPC ................. *A01G 25/092* (2013.01)

(58) Field of Classification Search
CPC ........... A01G 25/092; B60K 1/02; B05B 3/18
USPC ........................................................ 239/731
See application file for complete search history.

(56) References Cited

U.S. PATENT DOCUMENTS

| 4,580,731 | A | | 4/1986 | Kegel et al. | |
|---|---|---|---|---|---|
| 5,255,857 | A | | 10/1993 | Hunt | |
| 6,007,004 | A | * | 12/1999 | Unruh | A01G 25/092 239/69 |
| 6,036,121 | A | * | 3/2000 | Gerdes | A01G 25/162 239/1 |
| 6,042,031 | A | * | 3/2000 | Christensen | A01G 25/092 239/729 |
| 6,045,065 | A | * | 4/2000 | Gerdes | A01G 25/092 239/1 |
| 6,068,197 | A | * | 5/2000 | Tolson | A01G 25/097 239/1 |
| 6,085,999 | A | * | 7/2000 | Gerdes | A01G 25/092 239/66 |
| 6,095,439 | A | * | 8/2000 | Segal | A01G 25/092 239/69 |
| 6,337,971 | B1 | | 1/2002 | Abts | |

(Continued)

OTHER PUBLICATIONS

Glenn Elert, Acceleration, 1998-2017, The Physics Hypertextbook, https://physics.info/acceleration/.*

*Primary Examiner* — Chee-Chong Lee
(74) *Attorney, Agent, or Firm* — Dorr, Carson & Birney PC

(57) ABSTRACT

An irrigation system with transient state speeds of movement achieves and maintains substantial straight alignment of multiple interconnected spans with continuous movement over a range of speeds in a forward and reverse movement direction. A variable-speed drive controller monitors and processes the output of the corresponding alignment detector and, based on the output of the alignment detector, selects from memory and continuously furnishes to the corresponding span motor a predetermined progressively increasing speed profile or a predetermined progressively decreasing speed profile.

4 Claims, 23 Drawing Sheets

(56) References Cited

U.S. PATENT DOCUMENTS

| | | |
|---|---|---|
| 6,755,362 B2 | 6/2004 | Krieger et al. |
| 6,820,828 B1 | 11/2004 | Greenwalt |
| 7,384,008 B1 | 6/2008 | Malsam |
| 7,584,053 B2 | 9/2009 | Abts |
| 8,849,468 B2 | 9/2014 | Abts et al. |
| 2002/0008167 A1 | 1/2002 | Haberland et al. |
| 2003/0066912 A1 | 4/2003 | Krieger et al. |
| 2004/0093912 A1 | 5/2004 | Krieger et al. |
| 2006/0027677 A1 | 2/2006 | Abts |
| 2007/0267524 A1 | 11/2007 | Mack |
| 2010/0032493 A1 | 2/2010 | Abts et al. |
| 2013/0018553 A1 | 1/2013 | Malsam |
| 2013/0211717 A1 | 8/2013 | Abts |
| 2013/0253752 A1 | 9/2013 | Grabow |
| 2014/0225747 A1 | 8/2014 | Abts |

* cited by examiner

IRRIGATION SYSTEM WITH TRANSIENT STATE SPEEDS OF MOVEMENT

RELATED APPLICATIONS

The present application references the continuation-in-part of the Applicants' pending U.S. patent application Ser. No. 13/567,185, filed on Oct. 11, 2012, and is hereby incorporated by reference in its entirety.

BACKGROUND OF THE INVENTION

Field of the Invention

The present invention relates to transient state speeds of movement for irrigation systems and more particularly pertains to a new system for achieving and maintaining substantial straight alignment of the spans of an irrigation system with continuous movement over a range of speeds in a forward and reverse movement direction that minimizes or eliminates strenuous and repetitive start-and-stop movements by elements of the irrigation system.

Description of the Prior Art

Mechanized irrigation systems, such as center pivot or lateral move irrigation systems, typically employ a series of pipe spans supported above a ground surface by tower structures that may include wheels or crawler tracks mounted on the tower structures, that are driven to advance the spans about a field in either a forward movement direction or a reverse movement direction. For the purposes of the present invention, the mechanized irrigation system will be referred to as the irrigation system and the pipes and the tower structures supporting the pipes will be referred to collectively as spans. Each of the spans move relatively independently of the other spans, and the movement of the spans is often performed in a follow the leader type manner in which an end span initially advances in either a forward movement direction or reverse movement direction of the irrigation system, and the remaining intermediate spans follow thereafter.

The forward movement direction or reverse movement direction of the irrigation system is dependent on either a clockwise rotation or counter clockwise rotation of the central shafts of the rotors of the span motors connected to reduction gearboxes that drive the rotation of the wheels contacting the ground surface. The direction of the rotation of the central shafts of the rotors of the span motors are conventionally controlled by conductors supplying power, typically, 3-phase, 480 volt AC (alternating current), to the span motors. Conventional 3-phase induction motors provide inherently high starting torques and high efficiency in operation, typically at 60 Hz (cycles per second), on irrigation systems of the prior art and such motors may also be used as the 3-phase span motors of the present invention.

In the case of 3-phase span motors as conventionally used on center pivots, such span motors typically operate at a fixed span motor RPM (revolutions per minute) of approximately 1,750. Gear reduction is provided to achieve a pace of movement over the ground of the wheels of about 0.8 wheel RPM. Such span motors can also easily be reversed (e.g., clockwise rotation of the central shafts of the rotors of the span motors to counterclockwise rotation of the central shafts of the rotors of the span motors). Reversal of the rotation of the central shafts of the rotors of the span motors is accomplished by simply reconfiguring the connections of any two of the three conductors L1, L2, L3 of the 3-phase supply power using a conventional electromechanical contactor device, typically located at a central control panel (not shown). This feature of 3-phase motors facilitates selecting a clockwise rotation or counter clockwise rotation of the central shafts of the rotors of the span motors, and, in turn, selecting either a forward movement direction or reverse movement direction of the irrigation system. A change in either the forward movement direction or reverse movement direction of the irrigation system is controlled conventionally for both the prior art and for the present invention by simply reconfiguring the connections of any two of the three conductors L1, L2, L3 of the 3-phase supply power.

Another convention of irrigation systems for the prior art is the use fixed-speed drive assemblies that may include an alignment detector with one or more single-pole, double-throw (SPDT) switches that are wired to receive either a forward movement direction signal or a reverse movement direction signal depending on either a forward movement direction or a reverse movement direction. These typical SPDT switches control the span motors of the fixed-speed drive assembly on and off while the irrigation system is moving in either a forward movement direction or a reverse movement direction. The discrete forward and reverse movement direction signals are communicated to the switches that each serve to signal two distinct states of alignment to control the 3-phase span motors on and off using a fixed-speed drive controller (e.g., electromechanical contactor or motor starter) of the fixed-speed drive assembly. Such forward and reverse movement direction signals are typically communicated to the switches using separately configured circuits as compared to the three conductors L1, L2, L3 of the 3-phase supply power that are configured to supply electrical power to the span motors.

In an example of the prior art, a forward movement direction signal may be present in a forward movement direction, and a reverse direction signal may be present in a reverse movement direction. In operation, conventional center pivot controls include both a forward movement direction signal and a reverse movement direction signal; however, only one of the two movement direction signals is present in a respective movement direction. Furthermore, the respective forward movement direction signal and reverse movement direction signal are each typically configured to cause the switches to signal the fixed-speed drive controller to control the span motors on and off in an opposite manner with regard to maintaining span alignment. For example, with the same state of alignment, a forward movement direction signal may be configured by the fixed-speed drive controller to control the span motor on and a reverse movement direction signal may be configured by the fixed-speed drive controller to control the span motor off.

The span motor of an intermediate span is typically controlled from span motor on to span motor off and span motor off to span motor on by a fixed-speed drive controller that monitors the output of the corresponding alignment detector that may include a single-pole, double-throw switch. Conventionally, in the prior art, the span motor RPM is not varied other than when the span motor is controlled from span motor on to span motor off and span motor off to span motor on. Such switch signals a discrete (i.e., binary logic, or two-state) on/off signal switch state to cycle control the span motor in an on/off manner. The switch may be located at spans adjacent to the flexible junctures where adjacent spans are interconnected. Relative movement of adjacent spans actuates these switches and, for example, enables the signaling of two distinct states of alignment of adjacent interconnected spans, such as that caused by the forward movement of an outer span about the flexible juncture of two adjacent spans. For example, the wheels of a lagging intermediate tower structure are driven in a forward movement direction by the rotation of one or more cams, rotated by one or more rods (e.g., mechanical linkage), that rotate against the roller-actuating arm of a corresponding switch that causes the internal contacts of the respective switch to close in a conventional single-pole, double-throw method that results in an "on" signal switch state controlling the 3-phase span motor on. Furthermore, in this example, the supply power supplied to the span motor is configured to rotate the central shaft of the rotor of such span motor in a clockwise rotation and, thereby, the span is driven in a forward movement direction by a respective fixed-speed drive assembly until a substantial straight alignment is restored between the adjacent spans (i.e., respective intermediate tower structure not lagging and not leading). The switches signal two distinct states of alignment based on either a forward movement direction or a reverse movement direction and on a closed switch contact or an opened switch contact that results in either a span motor "on" control or a span motor "off" control.

The fixed-speed drive assemblies incorporating the span motors are, therefore, alternately and repeatedly controlled "on" and "off" by way of a discrete "on" signal switch state or "off" signal switch state. The wheels of the intermediate tower structures may each be driven in either a forward movement direction or a reverse movement direction at a uniform speed with closed switch contacts and stopped with opened switch contacts. This process is repeated by each successive intermediate tower structure of the irrigation system until all of the spans are brought into substantial straight alignment. Each time a tower structure is advanced in either a forward movement direction or a reverse movement direction, a new distinct state of alignment is signaled by the corresponding switch and the process is repeated.

In center pivot irrigation systems, the radially-outermost tower structure (or end tower structure) typically leads the movement of the spans of the irrigation system, while in a lateral move irrigation system either one of the end tower structures typically leads the movement of the spans of the irrigation system. In a center pivot irrigation system, the outermost or end span wheel track has the largest circumference; and, therefore, the end span has the farthest distance to travel. In the prior art, the intermediate spans have relatively smaller wheel track circumferences and therefore can always keep up with the pace of the end span while using substantially the same fixed-speed span motors, assuming similar wheel tire sizes and gearing ratios.

This conventional manner of movement and substantial straight alignment of the spans of irrigation systems requires countless starts-and-stops by the intermediate tower structures, and the corresponding fixed-speed drive assemblies that move them. The number of repeated on-and-off control cycles of the corresponding span motor providing the movement for a respective intermediate tower structure can exceed one thousand a day during continuous operation. This repeated on-and-off control cycling of the corresponding span motors, which is repeated every day, all day, that the irrigation system is operating, causes excessive wear on the electrical components, structural components, and mechanical parts of the fixed-speed drive assembly, especially the span motors, knuckles and gearboxes transferring power to the wheels.

To mitigate the stress on the irrigation system caused by the repetitive start-and-stop movement of fixed-speed drive assemblies typically utilizing alignment detectors as discussed above, movement control systems have been proposed to provide a relatively smooth and continuous movement of the intermediate spans and their respective intermediate tower structures. These continuous movement control systems typically employ potentiometers or other analog sensors, such as capacitive displacement sensors, strain gauge sensors, non-contact proximity sensors or other devices capable of quantifiably measuring a precise degree of span alignment. Analog alignment sensor signals vary in magnitude in direct correlation or proportion to the degrees of deviation in alignment of one span with respect to adjacent interconnected spans. Such analog alignment sensor signals are monitored and processed by variable-speed drive controllers configured to vary aspects of the supply power (i.e., vary the speed) furnished to the corresponding span motor. This, in turn, varies the span motor RPM that, in turn, varies the RPM of the wheels in response to changing analog alignment sensor signals. These analog type sensors are in lieu of typical rod and switch actuators and cams or similar discrete signaling devices that merely use a switch to signal if the state of alignment is beyond a preset maximum value, as is the case with the conventional systems of the prior art for center pivot irrigation system movement control systems.

The variations in the magnitude or intensity of analog sensor signals are monitored and processed by variable-speed drive controllers that, in turn, vary aspects of the supply power (i.e., vary the speed) furnished to the corresponding span motors turning the wheels of the intermediate tower structures in substantially direct correlation or proportion to the degrees of deviation in alignment as detected and outputted by the analog sensors, such that detection of greater angles of deviation in alignment of the interconnected spans results in relatively faster span motor speeds, and detection of relatively lower angles of deviation in alignment results in relatively slower span motor speeds. Such means of varying span motor speeds in direct proportion to the degrees of deviation in alignment as detected and outputted by the analog sensors (i.e., the selected speed of the variable-speed drive controller is based upon the alignment) to maintain substantial straight alignment of the spans with continuous movement requires the span motors to constantly transition between faster speeds and slower speeds (i.e., transient state speeds of movement) as opposed to evolving to unchanging fixed-speeds (i.e., steady state speeds of movement).

Krieger (U.S. Pat. No. 6,755,362), Malsam (U.S. Patent App. Pub. No. 2013/0018553) and Grabow (U.S. Patent App. Pub. No. 2013/0253752) have proposed to provide a relatively smooth and continuous movement and substantial straight alignment of spans using potentiometers or other analog sensors or, in the case of Grabow, GPS (global positioning system) data is used as a means of generating analog alignment sensor signals for varying span motor speeds in direct proportion to the degrees of deviation in alignment.

SUMMARY OF THE INVENTION

The present invention discloses an irrigation system that is configured to maintain substantial straight alignment of the spans of an irrigation system with continuous movement over a range of speeds in a forward and reverse movement direction. The present irrigation system includes multiple interconnected spans that are supported by multiple tower structures. Each intermediate tower structure may include a variable-speed drive assembly that may include a variable-speed drive controller that varies aspects of the supply power (i.e., varies the speed) furnished to the corresponding span motor to control the speed of movement of the respective variable-speed drive assembly in either a forward movement direction or a reverse movement direction, such variable-speed drive controller selecting from memory and continuously furnishing to the corresponding span motor a predetermined progressively increasing speed profile or a predetermined progressively decreasing speed profile so as to maintain span alignment. The predetermined progressively increasing speed profiles and predetermined progressively decreasing speed profiles consist of one or more rates of change in speed over time as opposed to a selected speed. The variable-speed drive assembly associated with each corresponding intermediate span may include an alignment detector configured to detect and output two distinct states of alignment. Such alignment detector may include a switch having two signal switch states to signal either an "on" signal switch state or an "off" signal switch state based on two distinct states of alignment of adjacent intermediate spans in either a forward movement direction or a reverse movement direction. The rotation of one or more cams, rotated by one or more rods, that rotate against the roller-actuating arm of a corresponding switch may cause the internal contacts of the respective switch to open and close in a conventional single-pole, double-throw method.

In the prior art, a switch is incorporated into each alignment detector of each fixed-speed drive assembly and is in communication with a fixed-speed drive controller configured to repeatedly on-and-off control cycle the corresponding span motor to maintain substantial straight alignment of the spans of the irrigation system with transient state speeds of movement (i.e., span motor on to span motor off and span motor off to span motor on). In an embodiment of the present invention, the variable-speed drive assembly may utilize the same alignment detector, that is typically utilized by conventional repetitive start-and-stop movement control systems of electric-drive center pivot irrigation systems described in the prior art, to communicate the "on" and "off" signal switch states to a variable-speed drive controller. The variable-speed drive controller monitors and processes the output of the corresponding alignment detector and, based on the output of the alignment detector, selects from memory and continuously furnishes to the corresponding span motor a predetermined progressively increasing speed profile or a predetermined progressively decreasing speed profile (i.e., the selected predetermined progressively increasing speed profiles and the selected predetermined progressively decreasing speed profiles of the variable-speed drive controller are based upon the alignment). This, in turn, either progressively increases the speed or progressively decreases the speed of the span motor in a predetermined manner over time to maintain substantial straight alignment of the spans of the irrigation system with transient state speeds of movement (i.e., increasing span motor speeds to decreasing span motor speeds and decreasing span motor speeds to increasing span motor speeds).

It should be noted that both the conventional repetitive start-and-stop movement control systems and the movement control system of the present invention serve to maintain substantial straight alignment of the spans of an irrigation system with transient state speeds of movement. The present invention, however, further maintains substantial straight alignment of the spans of an irrigation system with continuous movement of the irrigation system over a range of speeds in a forward and reverse movement direction without the strenuous and repetitive start-and-stop movements of the prior art that result from repeated on-and-off control cycling of the corresponding span motors.

BRIEF DESCRIPTION OF THE DRAWINGS

The detailed description is described with reference to the accompanying figures.

DETAILED DESCRIPTION OF THE INVENTION

Figure 1A:
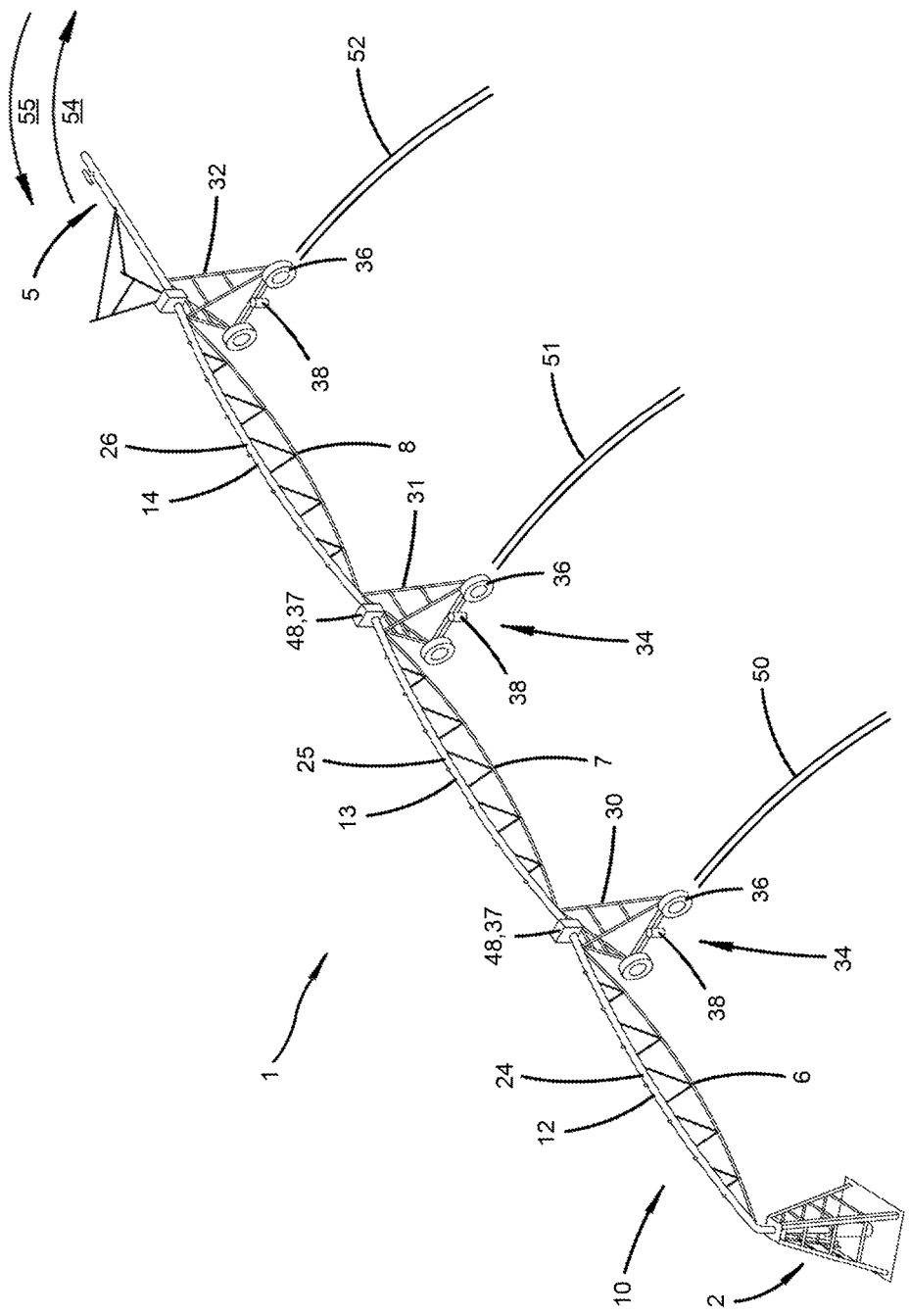
FIG. 1A is an isometric diagrammatic perspective view of an irrigation system in accordance with an example implementation of the prior art.

Overview. Irrigation systems, such as center pivot irrigation systems, generally include fixed-speed drive assemblies at each of the intermediate tower structures to propel the irrigation systems over a respective ground surface, cultivation area or field. Such irrigation systems rely on span motors with fixed-rate speeds of the central shafts of the rotors of such span motors due to their relative simplicity and robustness. Such systems, however, can only adjust the relative alignment of various span portions by repeated on-and-off control cycling of the corresponding span motors as roving spans change states of alignment in either a forward movement direction or a reverse movement direction. This results in each intermediate tower structure coming to a complete stop and then requiring a large impulse of power to the corresponding span motor to start the intermediate tower structure moving again. These strenuous and repetitive start-and-stop movements that result from repeated on-and-off control cycling of the corresponding span motors can result in excessive stress on structures, wear on components, and downtime of the irrigation system. The irregular motion caused by these strenuous and repetitive start-and-stop movements in order to maintain a substantial straight alignment of the spans can also cause uneven application of irrigation water and/or chemicals to the field. This results in waste of both water and chemicals. The irregular motion can also cause deviations in alignment or errors in determining the position of the end of the machine. This can result in errors in operations based on position.

Accordingly, an irrigation system with transient state speeds of movement is disclosed that is configured to maintain a substantial straight alignment among multiple adjacent spans without the irregular motion caused by the strenuous and repetitive start-and-stop movements wherein corresponding span motors are repeatedly control cycled between span motor on and span motor off as described above. In an implementation, an irrigation system includes multiple interconnected spans that are supported by multiple tower structures. Each intermediate tower structure may include a variable-speed drive assembly that may include a variable-speed drive controller that varies aspects of the supply power (i.e., varies the speed) furnished to the corresponding span motor to control the speed of movement of the respective variable-speed drive assembly in either a forward movement direction or a reverse movement direction, such variable-speed drive controller selecting from memory and continuously furnishing to the corresponding span motor a predetermined progressively increasing speed profile or a predetermined progressively decreasing speed profile so as to maintain span alignment. Such predetermined speed profiles may consist of one or more rates of change in speed over time (e.g., ramp up speed, ramp down speed, step up speed, step down speed, etc.).

In an embodiment of the present invention, each variable-speed drive assembly of the intermediate spans of the irrigation system may include an alignment detector configured to detect and output two distinct states of alignment. Such alignment detector may include a switch having two signal switch states. Such switch may include a roller-actuating arm that is actuated by the rotational movement of a cam connected to a rod associated with a corresponding intermediate span to signal two distinct states of alignment of the corresponding span with respect to an adjacent span. Within each variable-speed drive assembly, an alignment detector with a corresponding switch is in communication with a corresponding variable-speed drive controller. Each variable-speed drive controller is configured to monitor and process the output of the corresponding alignment detector and, based on the output of the alignment detector, to select from memory and continuously furnish to the corresponding span motor a predetermined progressively increasing speed profile or a predetermined progressively decreasing speed profile so as to maintain the interconnected spans in a substantially linear orientation to the respective longitudinal axes of the spans (e.g., maintain substantial straight alignment of the spans with respect to each other).

Prior Art. FIG. 1A illustrates a self-propelled (e.g., mechanized) irrigation system 1 in accordance with an embodiment of the prior art. Examples of self-propelled irrigation systems include a center pivot irrigation system 1, a linear move irrigation system (not shown), or the like. FIG. 1A illustrates an embodiment of the prior art wherein the irrigation system 1 is a center pivot irrigation system. As shown, the irrigation system 1 may include a center pivot point structure 2, a main section assembly 10 (irrigation section assembly) coupled (e.g., connected) to the center pivot point structure 2. The center pivot point structure 2 has access to a water source to furnish water to the irrigation system 1.

Figure 2A:
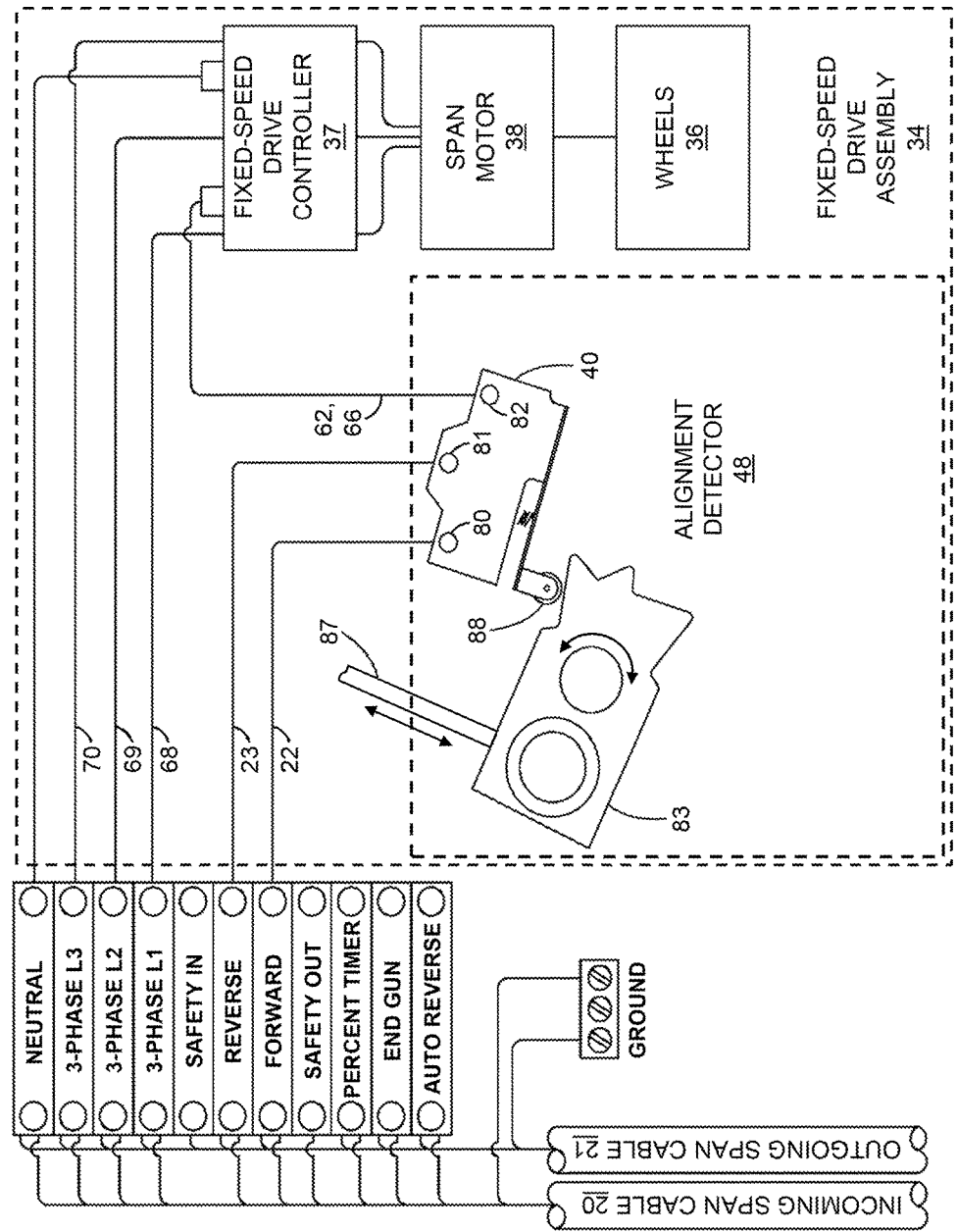
FIG. 2A is a schematic diagram illustrating the selected elements of the fixed-speed drive assembly of the irrigation system shown in FIG. 1A in accordance with an example implementation of the prior art.

FIG. 2A illustrates a fixed-speed drive assembly 34 typical of conventional irrigation systems 1. Each fixed-speed drive assembly 34 may include an alignment detector 48 (including a switch 40 with a roller-actuating arm 88, a normally closed switch contact 80, a normally opened switch contact 81, and a common switch contact 82, a cam 83, and a rod 87), a span motor 38, wheels 36, and a fixed-speed drive controller 37. The fixed-speed drive controller 37 typically used in the prior art is an electromechanical contactor or motor starter that controls the repeated on-and-off control cycling of each corresponding span motor 38, such repeated on-and-off control cycling of each corresponding span motor 38 being necessary to achieve and maintain substantial straight alignment of the spans and speed of movement in either a forward movement direction 54 or a reverse movement direction 55 while the irrigation system 1 is operating.

Figure 3A:
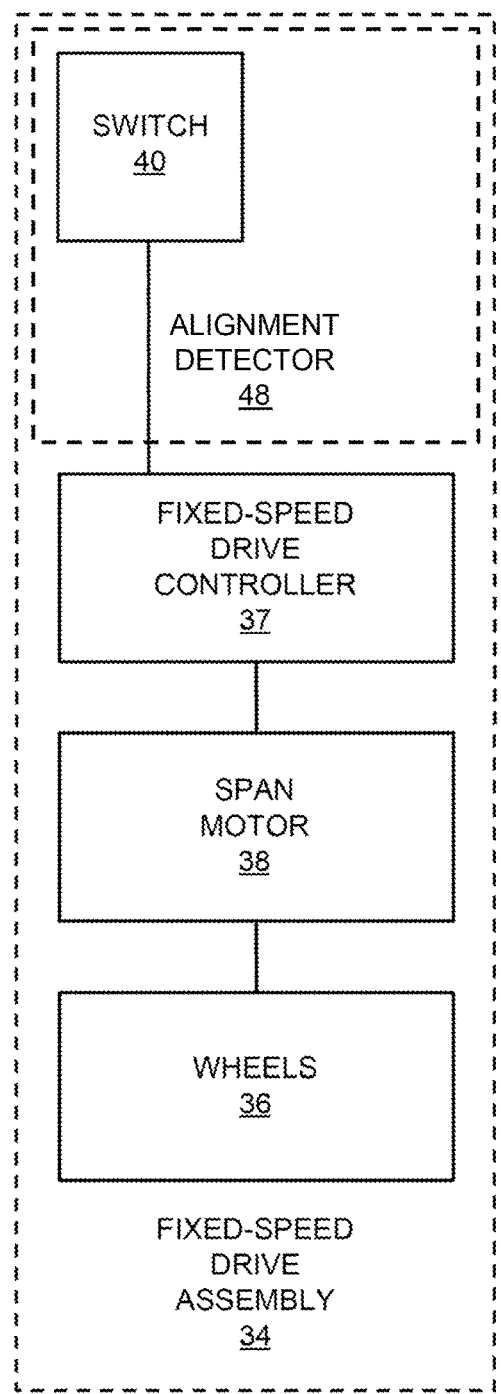
FIG. 3A is a block diagram illustrating the selected elements of the fixed-speed drive assembly of the irrigation system shown in FIG. 1A in accordance with an example implementation of the prior art.

FIG. 3A is a block diagram illustrating selected elements of the fixed-speed drive assembly 34 of the irrigation system 1 shown in FIG. 1A in accordance with an example of the prior art.

Figure 4A:
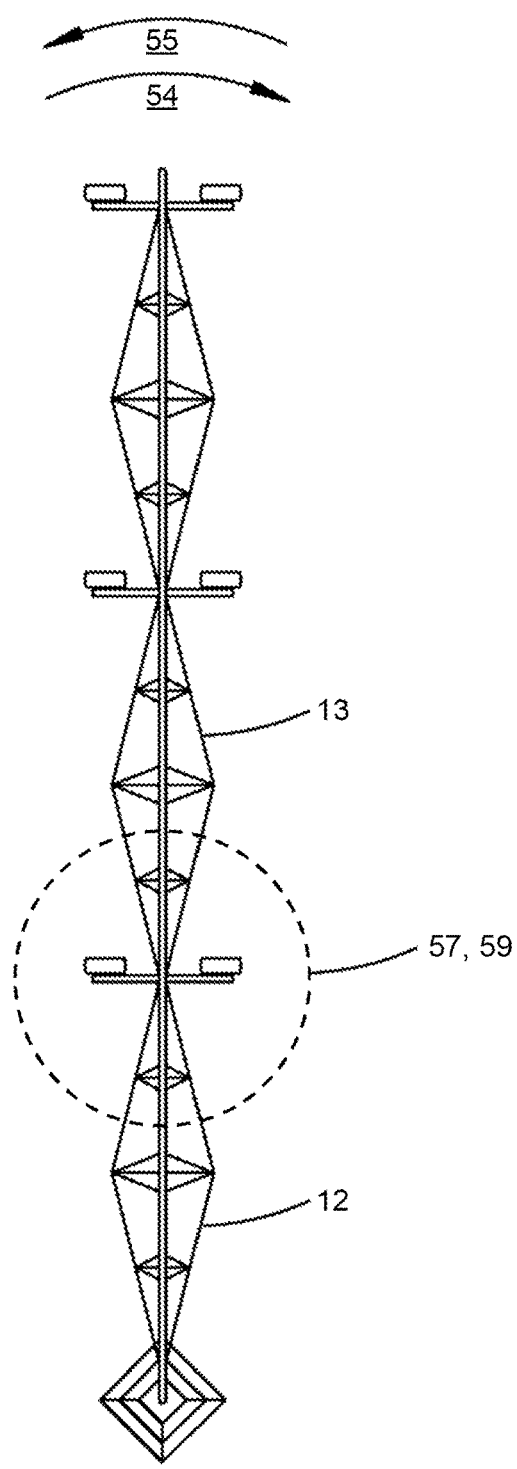
FIG. 4A is an illustration of the respective longitudinal axes of the spans of an irrigation system shown in FIGS. 1A and 1B in substantial straight alignment in either a forward movement direction or a reverse movement direction in accordance with an example implementation of the prior art and with an example implementation of the present invention.
Figure 4B:
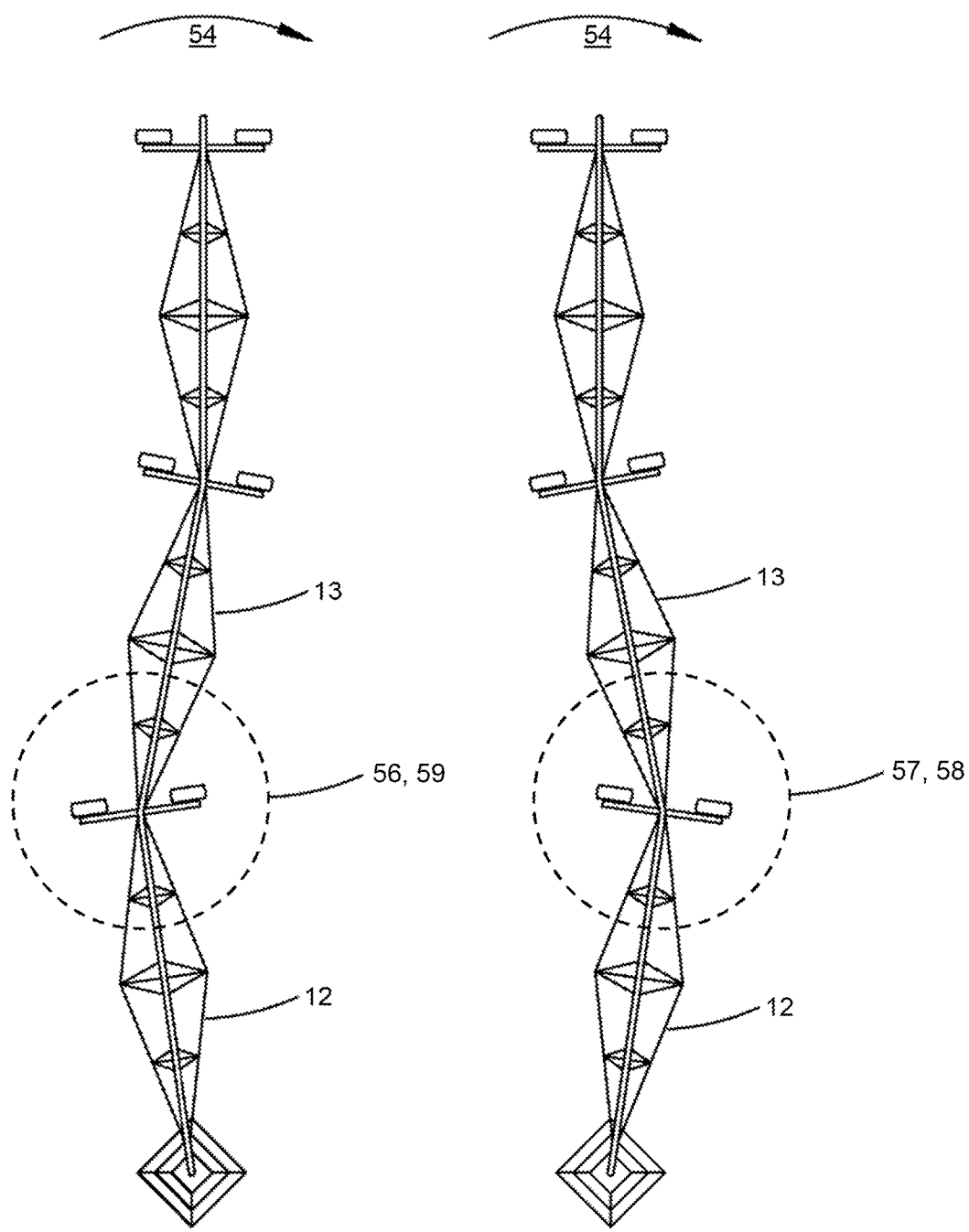
FIG. 4B is an illustration of the respective longitudinal axes of the spans of an irrigation system shown in FIGS. 1A and 1B in deviations in alignment in a forward movement direction in accordance with an example implementation of the prior art and with an example implementation of the present invention.
Figure 4C:
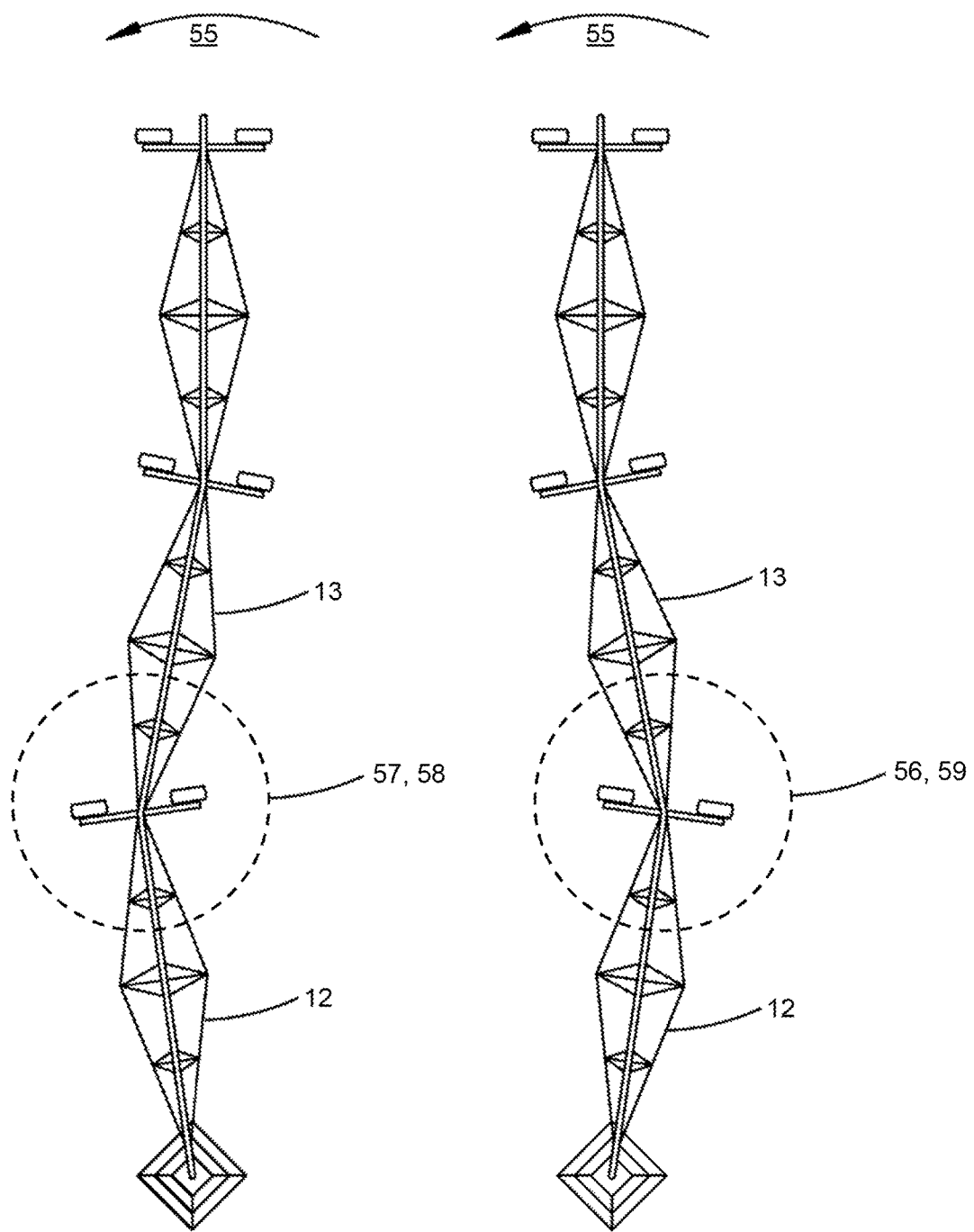
FIG. 4C is an illustration of the respective longitudinal axes of the spans of an irrigation system shown in FIGS. 1A and 1B in deviations in alignment in a reverse movement direction in accordance with an example implementation of the prior art and with an example implementation of the present invention.

FIGS. 4A, 4B, and 4C are illustrations of the respective longitudinal axes of the intermediate spans 12, 13 and end span 14 with deviations in alignment in either a forward movement direction 54 or a reverse movement direction 55 of an irrigation system 1 shown in FIG. 1A in accordance with an example implementation of the prior art.

Figure 5A:
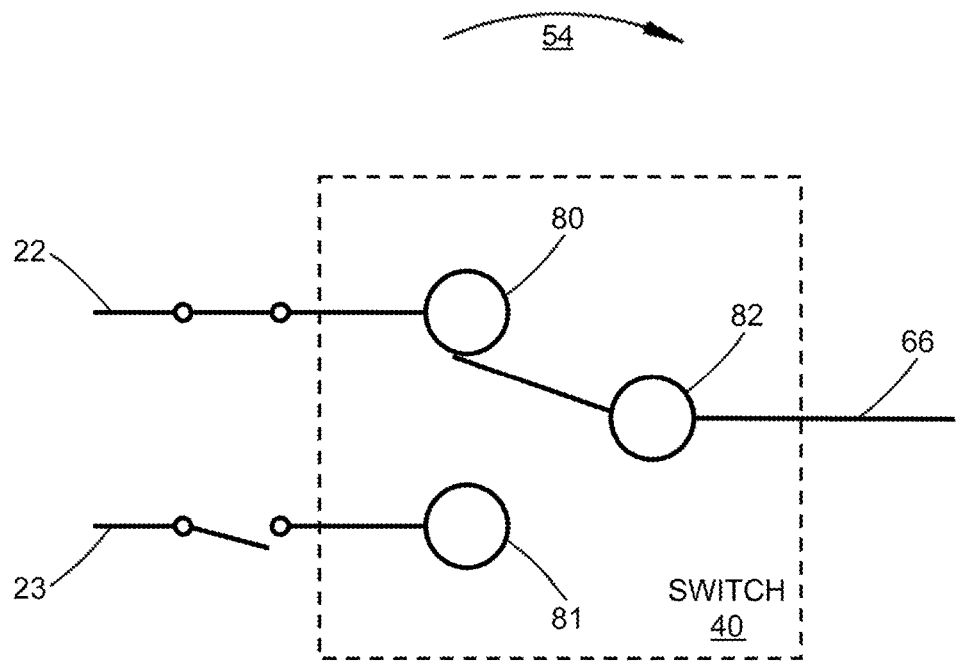
FIG. 5A is a schematic diagram illustrating the selected elements of the switch shown in FIGS. 2A and 2B in a forward movement direction in accordance with an example implementation of the prior art and with an example imple
Figure 5A:
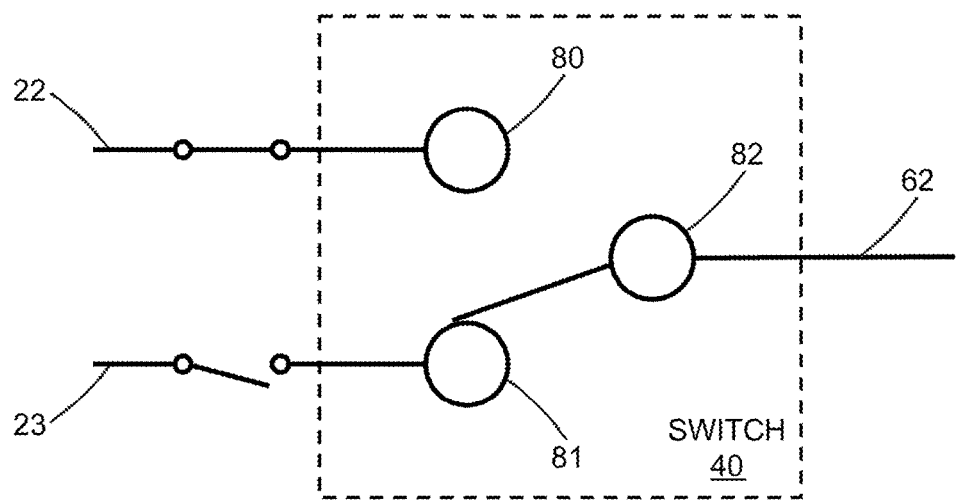

FIG. 5A is two schematic diagrams of the switch 40 of the irrigation system 1 shown in FIG. 1A in a forward movement direction 54 illustrating the double-pole, single-throw method of the switch 40 configured in the upper diagram to indicate the switch 40 in an "on" signal switch state 66 and in the lower diagram to indicate the switch 40 in an "off" signal switch state 62 in accordance with an example of the prior art.

Figure 5B:
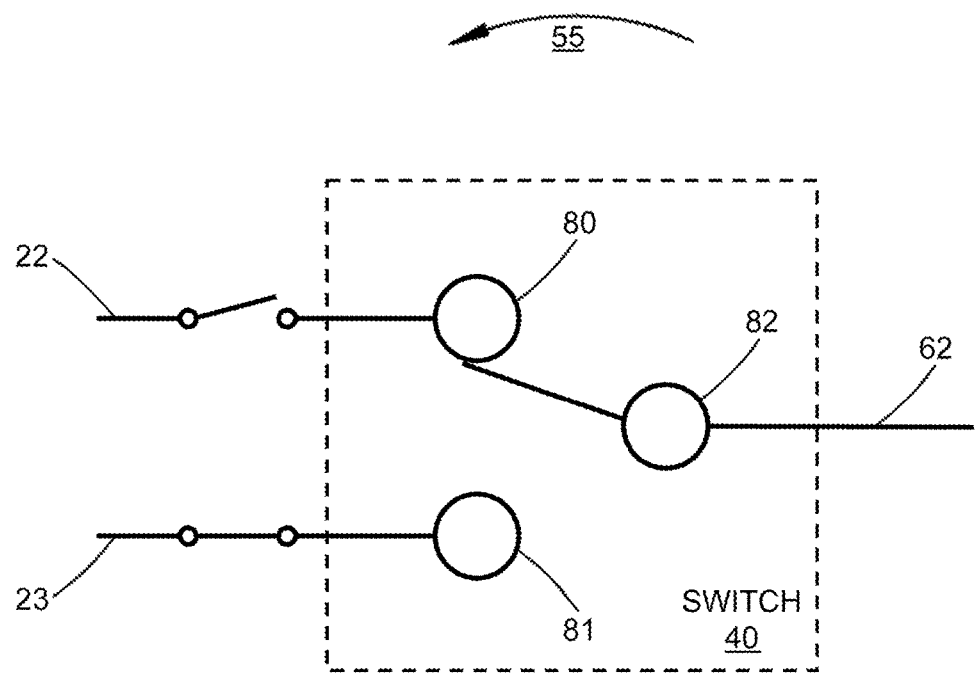
- FIG. 5B is a schematic diagram illustrating the selected elements of the switch shown in FIGS. 2A and 2B in a reverse movement direction in accordance with an example implementation of the prior art and with an example implementation of the present invention.
Figure 5B:
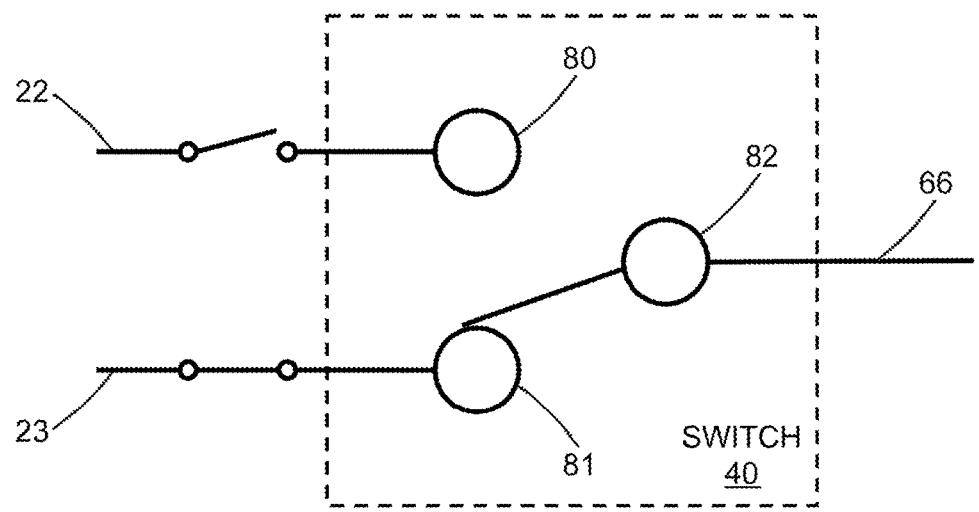

FIG. 5B is two schematic diagrams of the switch 40 of the irrigation system 1 shown in FIG. 1A in a reverse movement direction 55 illustrating the double-pole, single-throw method of the switch 40 configured in the upper diagram to indicate the switch 40 in an "off" signal switch state 62 and in the lower diagram to indicate the switch 40 in an "on" signal switch state 66 in accordance with an example of the prior art.

Figure 6:
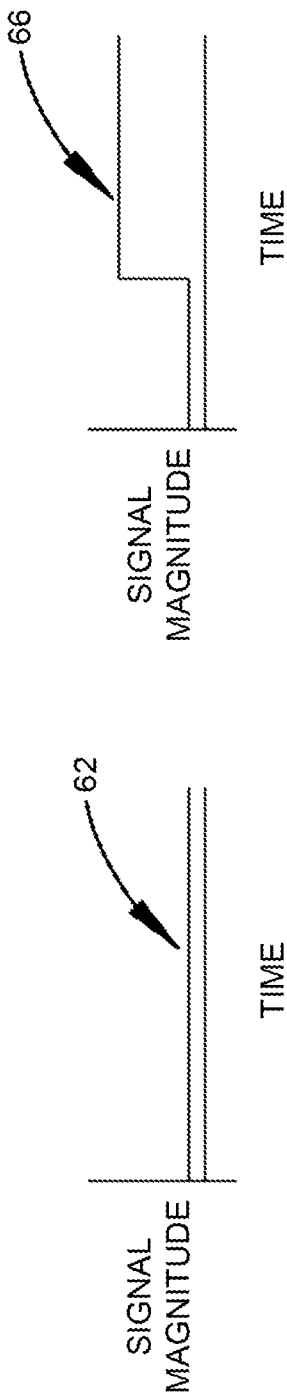
FIG. 6 is a graphical diagram illustrating the signal magnitudes of the switches of the irrigation system shown in FIGS. 1A and 1B in accordance with an example implementation of the prior art and with an example implementation of the present invention.
Figure 7:
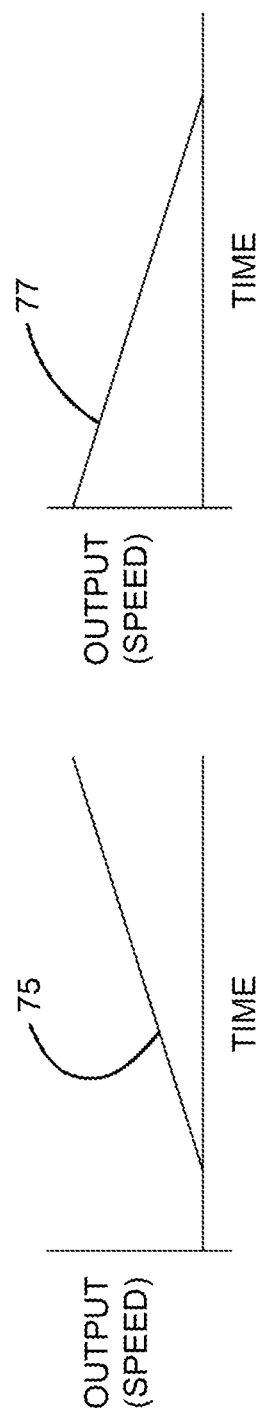
FIG. 7 is a graphical diagram illustrating a predetermined progressively increasing speed profile and a predetermined progressively decreasing speed profile of the variable-speed drive controller, such speed profiles selected from memory and continuously furnished to the corresponding span motors of the irrigation system shown in FIG. 1B in accordance with an example implementation of the present invention.

FIG. 6 is a graphical diagram illustrating the signal magnitudes of the switch 40 of the irrigation system 1 shown in FIG. 1A in accordance with an example of the prior art.

Figure 8A:
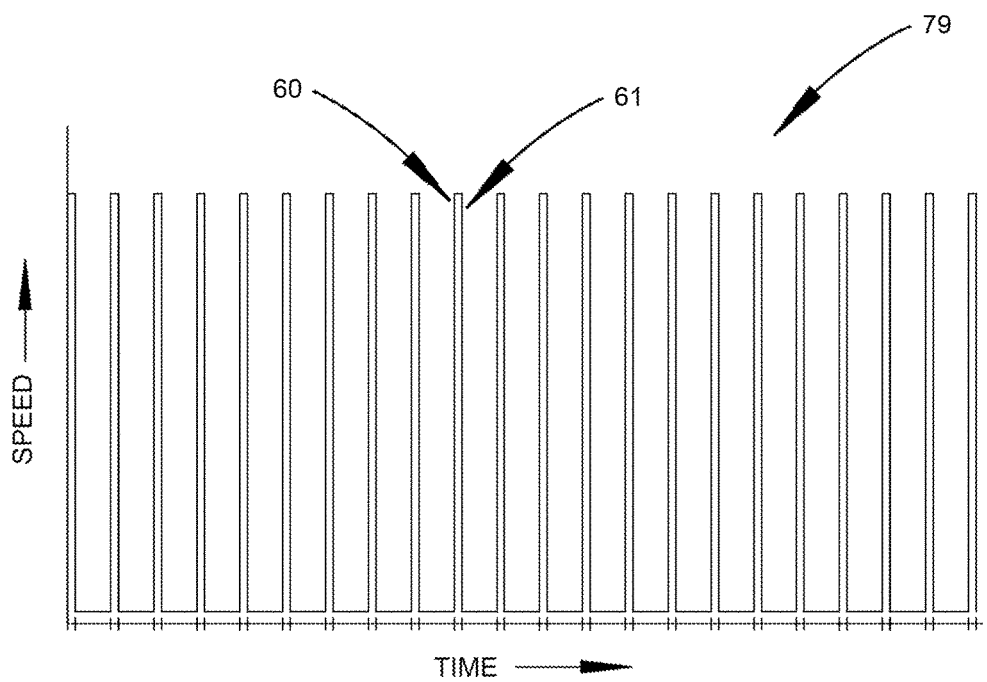
FIG. 8A is a graphical diagram illustrating transient state speeds of movement that result from the fixed-speed drive controller of the irrigation system shown in FIG. 1A in accordance with an example of the prior art repeatedly control cycling between span motor on and span motor off.

FIG. 8A is a graphical diagram illustrating transient state speeds of movement 79 that result from the fixed-speed drive controller 37 of the irrigation system 1 shown in FIG. 1A in accordance with an example of the prior art repeatedly control cycling between span motor on 60 and span motor off 61. The fixed-speed drive controller 37 controls the span motor on 60 based on an "on" signal switch status 66 and controls the span motor off 61 based on an "off" signal switch status 62.

Figure 1B:
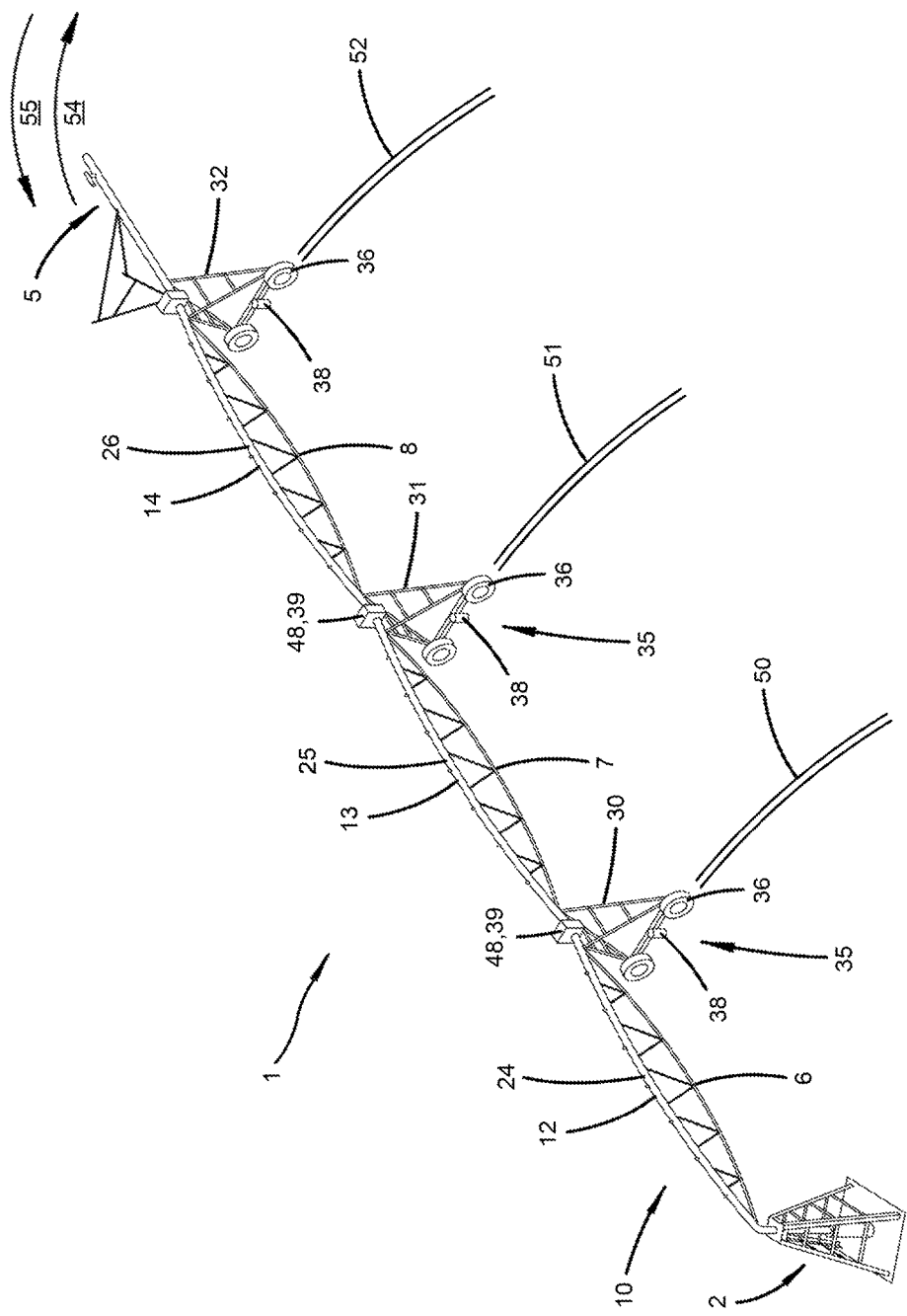
FIG. 1B is an isometric diagrammatic perspective view of an irrigation system in accordance with an example implementation of the present invention.

Example Implementations of the Present Invention. FIG. 1B illustrates a self-propelled (e.g., mechanized) irrigation system (assembly) 1 in accordance with example implementations of the present invention. Examples of self-propelled irrigation systems include a center pivot irrigation system, a linear move irrigation system, or the like. FIG. 1B illustrates an embodiment of the present invention wherein the irrigation system 1 is a center pivot irrigation system. However, it is contemplated that the present invention may be implemented in other self-propelled irrigation systems (e.g., linear move irrigation systems). As shown, the irrigation system 1 may include a center pivot point structure 2, a main section assembly 10 (irrigation section assembly) coupled (e.g., connected) to the center pivot point structure 2. The center pivot point structure 2 has access to a water source to furnish water to the irrigation system 1.

The main section assembly 10 includes a number of interconnected intermediate spans 12, 13 with applicant conduits 24, 25 that are each supported by a truss-type framework structure 6, 7 and by one or more intermediate tower structures 30, 31 and an interconnected end span 14 with applicant conduit 26 that is supported by a truss-type framework structure 8 and by an end tower structure 32. The intermediate tower structures 30, 31 and end tower structure 32 are configured to travel about the center pivot point structure 2 in a circular path that creates wheel tracks 50, 51, 52. The intermediate tower structures 30, 31 and end tower structure 32 may be any tower configuration known in the art to adequately support the applicant conduits 24, 25, 26, (e.g., pipes) described herein. It is to be understood that the main section assembly 10 may include any number of spans 24, 25, 26 and intermediate tower structures 30, 31 and end tower structure 32. The direction of travel for the main section assembly 10 can be either a forward movement direction 54 or a reverse movement direction 55.

The intermediate tower structures 30, 31 and the end tower structure 32 each may include one or more wheels 36, to assist in traversing the irrigation system 1 so as to pivot the main section assembly 10 about a ground surface, cultivation area or field in a forward movement direction 54 or a reverse movement direction 55 along wheel tracks 50, 51, 52. As shown in FIGS. 1A and 1B, each intermediate span 12, 13 and end span 14 may include applicant conduits 24, 25, 26 (e.g., pipes) that are configured to carry liquid (e.g., applicant) along the length of the irrigation system 1 to one or more applicant dispersal assemblies that are configured to irrigate the cultivation area. Each conduit 24, 25, 26 may be coupled to one another to allow fluid communication between each conduit. In an implementation, the applicant conduits 24, 25, 26 may be supported by truss-type framework structures 6, 7, 8. Thus, the main fluid displacement device may be configured to displace applicant through the applicant conduits 24, 25, 26. As shown in FIGS. 1A and 1B, the irrigation system 1 also may include a cantilevered boom structure 5 that extends outwardly from the end tower structure 32.

Both the forward movement direction 54 and the reverse movement direction 55 are dependent on the direction of rotation the central shafts of the rotors of the span motors 38. The wiring configuration of 3-phase supply power 67 conductor-L1 68, conductor-L2 69 and conductor-L3 70 (FIGS. 2A and 2B) included in incoming span cable 20 and outgoing span cable 21 may be configured to result in either a clockwise rotation or a counter clockwise rotation of the central shafts of the rotors of the span motors 38. Simply reconfiguring two of the three 3-phase supply power 67 conductor-L1 68, conductor-L2 69 and conductor-L3 70 results in a reversal of the rotation of the central shafts of the rotors of the span motors 38. Thus, in operation, the forward movement direction 54 or reverse movement direction 55 for irrigation system 1 is conventionally changed, both in the prior art and in the system of the present invention, from forward to reverse or reverse to forward using an electromechanical contactor device, typically located at a central control panel (not shown) and controlled by an operator, connected to span cable out 20 at a central control panel (not shown) at center pivot point structure 2 (FIGS. 1A and 1B). The operation of said electromechanical contactor device configures 3-phase supply power 67 conductor-L1 68, conductor-L2 69 and conductor-L3 70 (FIGS. 2A and 2B) in incoming span cable 20 so as to provide either a clockwise rotation or a counter clockwise rotation of the central shafts of the rotors of the span motors 38 that results in the desired forward movement direction 54 or reverse movement direction 55, as selected by an operator.

Figure 2B:
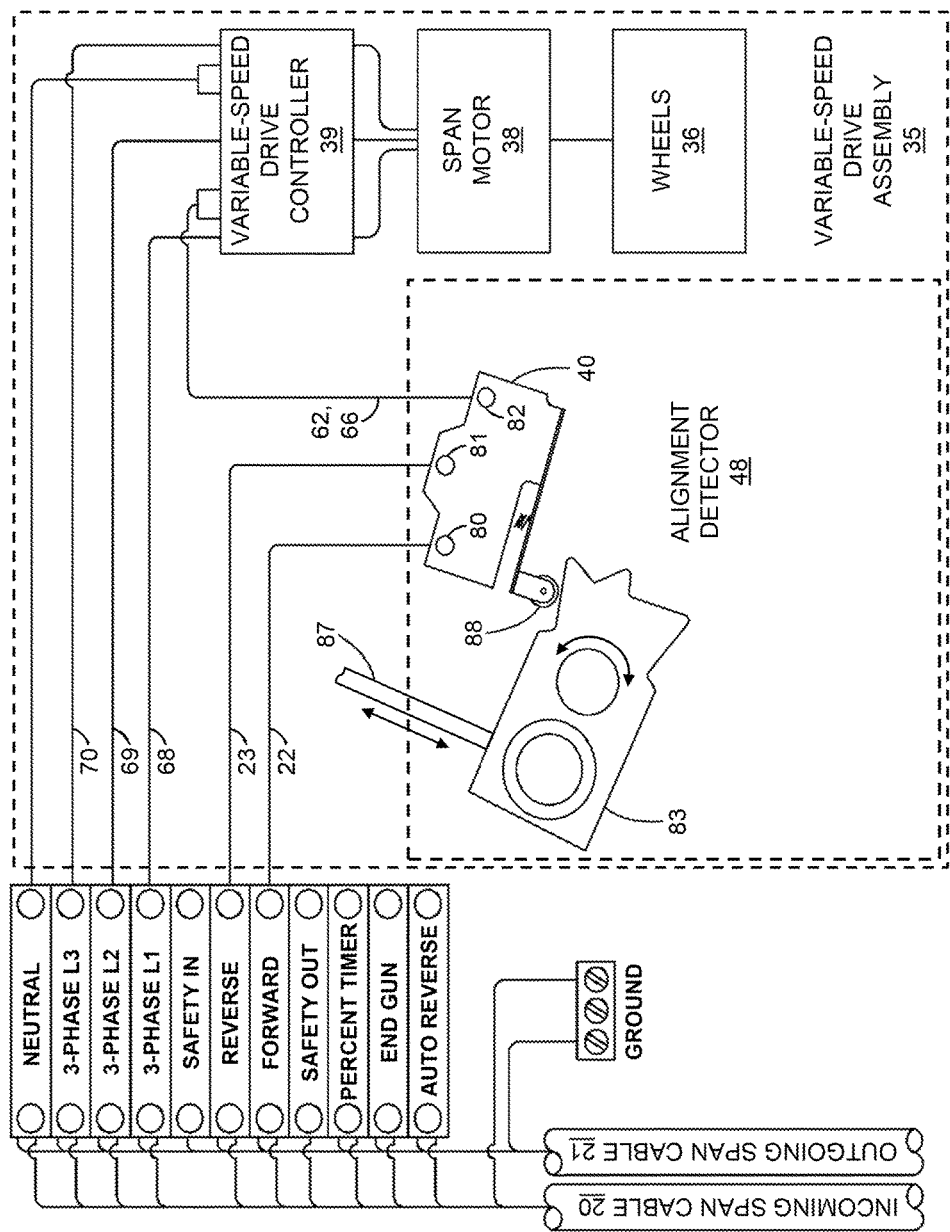
FIG. 2B is a schematic diagram illustrating the selected elements of the variable-speed drive assembly of the irrigation system shown in FIG. 1B in accordance with an example implementation of the present invention.

With reference to FIGS. 2A and 2B, it should also be noted that typically the same electromechanical contactor device, typically located at a central control panel (not shown) and controlled by an operator, configures 3-phase supply power 67 conductor-L1 68, conductor-L2 69 and conductor-L3 70 to set the rotation of the central shafts of the rotors of span motors 38 to result in either a forward movement direction 54 or a reverse movement direction 55, also provides the respective forward direction signal 22 or reverse direction signal 23.

With reference to FIG. 2B, each variable-speed drive assembly 35 may include an alignment detector 48 (including a switch 40 with a roller-actuating arm 88, a normally closed switch contact 80, a normally opened switch contact 81, and a common switch contact 82, a cam 83, and a rod 87), a span motor 38, wheels 36, and a variable-speed drive controller 39 that varies aspects of the supply power 67 (i.e., varies the speed) furnished to the corresponding span motor 38. The forward direction signal 22 and reverse direction signal 23 are communicated to the variable-speed drive assembly 35 by way of incoming span cable 20 and outgoing span cable 21. The forward direction signal 22 and reverse direction signal 23 are each discretely connected by wire or other means to the switch 40.

With reference to FIGS. 2B, 5A and 5B, the forward direction signal 22 circuit is conventionally connected to a normally closed switch contact 80 in switch 40 and the reverse direction signal 23 circuit is conventionally connected to a normally opened switch contact 81 in switch 40 (although in an embodiment this configuration could be different). The actuation of roller-actuating arm 88 of switch 40 by the rotation of one or more cams 83, rotated by one or more rods 87, connects the common switch contact 82 of switch 40 alternatively either to the normally closed switch contact 80 (e.g., to the forward direction signal 22), or to the normally opened switch contact 81 (e.g., to the reverse direction signal 23). The forward direction signal 22 and reverse direction signal 23 as determined by the forward movement direction 54 and reverse movement direction 55 is thereby either closed to the common switch contact 82 of switch 40 or opened to the common switch contact 82 of switch 40, as determined by the position of roller-actuating arm 88 against cam 83. Thereby, common switch contact 82 signals either an "off" signal switch state 62 or an "on" signal switch state 66 to variable-speed drive controller 39 based, first, on either a forward direction signal 22 or a reverse direction signal 23 and, second, on the connection of common switch contact 82 to either the normally closed switch contact 80 or the normally opened switch contact 81. The common switch contact 82 is energized (i.e., signals an "on" signal switch state 66) when either a forward direction signal 22 or reverse direction signal 23 is enabled to pass through switch 40 based on the position of roller-actuating arm 88 against cam 83, rotated by one or more corresponding rods 87. The common switch contact 82 is de-energized (i.e., signals an "off" signal switch state 62) when neither a forward direction signal 22 nor reverse direction signal 23 is enabled to pass through switch 40 based on the position of the corresponding cam 83, rotated by one or more corresponding rods 87. In operation, alignment detector 48 outputs either an "on" signal switch state 66 or an "off" signal switch state 62, such output of alignment detector 48 being monitored and processed by the variable-speed drive controller 39 as shown in FIGS. 2B, 5A, 5B, 9A, 9B, 9C and 9D. The "on" signal switch state 66 and "off" signal switch state 62 output of alignment detector 48 is processed by processor 42 of variable-speed drive controller 39. Based on either an "on" signal switch state 66 or an "off" signal switch state 62, the processor 42 of the variable-speed drive controller 39 selects from memory 44 and continuously furnishes to the corresponding span motors 38, via the communications module 46, a predetermined progressively increasing speed profile 75 or a predetermined progressively decreasing speed profile 77 so as to achieve and maintain substantial straight alignment of corresponding intermediate spans 12, 13 with adjacent intermediate spans 12, 13 and end span 14 of irrigation system 1 with transient state speeds of movement 79.

In an implementation of the present invention, one or more intermediate tower structures 30, 31 may be controlled by a suitable variable-speed drive assembly 35, or the like, to assist in traversing the irrigation system 1 over a respective ground surface, cultivation area or field. For example, each intermediate tower structure 30, 31 may include a variable-speed drive assembly 35 to propel the respective intermediate tower structure 30, 31 over a respective ground surface, cultivation area or field in either a forward movement direction 54 or a reverse movement direction 55. It should be noted that the present invention does not require a variable-speed drive assembly 35 at the end tower structure 32. The end tower structure 32 can be controlled using a fixed-speed drive controller 37, a variable-speed drive controller 39, or by other means known in the art.

As described above, the variable-speed drive assembly 35 may incorporate one or more span motors 38 configured to drive the irrigation system 1 in a forward movement direction 54 or a reverse movement direction 55 based on the configuration of 3-phase supply power 67 conductor-L1 68, conductor-L2 69 and conductor-L3 70. In either a forward movement direction 54 or a reverse movement direction 55, the alignment between each intermediate span 12, 13 and between the outermost intermediate span 13 and end span 14 of the irrigation system 1 is maintained by the rotation of one or more cams 83, rotated by one or more rods 87, such cams rotating against and, thereby, actuating roller-actuating arm 88 of a corresponding switch 40 of the alignment detector 48 at each intermediate span 12, 13 flexible juncture (not shown) on the intermediate tower structures 30, 31.

With reference to FIGS. 2B and 5A, assuming a forward movement direction 54, the switch 40 is configured to signal either an "on" signal switch state 66 (e.g., energized via normally closed switch contact 80 closed to common switch contact 82 to allow a forward direction signal 22 from incoming span cable 20 to pass through switch 40 to variable-speed drive controller 39) or an "off" signal switch state 62 (e.g., not energized via normally closed switch contact 80 opened to common switch contact 82 to prevent a forward direction signal 22 from incoming span cable 20 to pass through switch 40 to variable-speed drive controller 39).

Again, with reference to FIGS. 2B and 5B, assuming a reverse movement direction 55, the switch 40 is configured to signal either an "on" signal switch state 66 (e.g., energized via normally opened switch contact 81 closed to common switch contact 82 to allow a reverse direction signal 23 from incoming span cable 20 to pass through switch 40 to variable-speed drive controller 39) or an "off" signal switch state 62 (e.g., not energized via normally opened switch contact 81 opened to common switch contact 82 to prevent a reverse direction signal 23 from incoming span cable 20 to pass through the switch 40 to variable-speed drive controller 39).

FIGS. 9A, 9B, 9C and 9D are flow diagrams illustrating various switch 40 configurations of alignment detector 48 that outputs either an "on" signal switch state 66 or an "off" signal switch state 62 to a variable-speed drive controller 39 based on, first, a forward direction signal 22 or a reverse direction signal 23 and, second, a closed or opened normally closed switch contact 80, a closed or opened normally opened switch contact 81 with common switch contact 82 of switch 40. In one or more embodiments, a forward direction signal 22 or a reverse direction signal 23, respectively, causes either an "on" signal switch state 66 or an "off" signal switch state 62 to be signaled by switch 40 of alignment detector 48. The output of either an "on" signal switch state 66 or an "off" signal switch state 62 by the alignment detector 48 is monitored and processed by the variable-speed drive controller 39 (as shown in FIGS. 2B, 5A, 5B, 9A, 9B, 9C and 9D) and processed by processor 42 of variable-speed drive controller 39. The processor 42 of the variable-speed drive controller 39, in turn, selects from memory 44 and continuously furnishes to the corresponding span motor 38, via the communications module 46, a predetermined progressively increasing speed profile 75 or a predetermined progressively decreasing speed profile 77 so as to achieve and maintain a substantial straight alignment of corresponding intermediate spans 12, 13 with adjacent intermediate spans 12, 13 and end span 14 of irrigation system 1 with transient state speeds of movement 79.

With reference to FIGS. 2B, 4A, 4B, and 5A in an embodiment with a forward direction signal 22, an "on" signal switch state 66 (upper illustration on FIG. 5A) may be defined as any intermediate span 12, 13 being either in a non-leading state of alignment 59 (FIG. 4A) or in a lagging state of alignment 56 (FIG. 4B) with one or more adjacent intermediate spans 12, 13 or end span 14 along a generally linear longitudinal axis (e.g., defined with respect to a generally horizontal surface, such as the ground). Similarly, with a forward direction signal 22, an "off" signal switch state 62 (lower illustration on FIG. 5A) may be defined as any intermediate span 12, 13 being either in a leading state of alignment 58 (FIG. 4B) or in a non-lagging state of alignment 57 (FIG. 4A) with one or more adjacent intermediate spans 12, 13 or an end span 14 along a generally linear longitudinal axis (e.g., defined with respect to a generally horizontal surface, such as the ground).

In an opposite manner to the above discussion (not illustrated), it is to be understood that with a forward direction signal 22, an "off" signal switch state 62 may be defined as any intermediate span 12, 13 being in either a leading state of alignment 58 (as shown in FIG. 4B) or in a non-lagging state of alignment 57 (as shown in FIGS. 4A and 4B) with one or more adjacent intermediate spans 12, 13 or an end span 14 along a generally linear longitudinal axis. Similarly, with a forward direction signal 22, an "on" signal switch state 66 may be defined as any intermediate span 12, 13 being in either a non-leading state of alignment 59 (as shown in FIGS. 4A and 4B) or in a lagging state of alignment 56 (as shown in FIG. 4B) with one or more adjacent intermediate spans 12, 13 or an end span 14 along a generally linear longitudinal axis.

More generally, it is to be understood that the switch 40 of the alignment detector 48 essentially functions as a switch having two signal switch states (e.g., an "on" signal switch state 66 and an "off" signal switch state 62) to signal two distinct states of alignment of adjacent spans along a generally linear longitudinal axis. For example, the switch 40 most commonly found on conventional center pivot irrigation systems may signal an "off" signal switch state 62 when the intermediate spans 12, 13 are in a leading state of alignment 58, and may signal an "on" signal switch state 66 when the intermediate spans 12, 13 are in a non-leading state of alignment 59. This could be reversed, so that the switch 40 may signal an "on" signal switch state 66 when the intermediate spans 12, 13 are in a lagging state of alignment 56, and may signal an "off" signal switch state 62 when the intermediate spans 12, 13 are in a non-lagging state of alignment 57. It is entirely a matter of design choice as to which switch 40 state corresponds to an on or off, a high or low, a positive or negative, etc., signal switch 40 state. Also, it should be noted that the terms "leading", "lagging", "non-leading" and "non-lagging" are relative to the direction of rotation or movement direction 54, 55 of the intermediate spans 12, 13 at any particular time, since most conventional irrigation systems can be operated in either direction under the control of the operator.

It is to be understood that in the system of the present invention the "on" signal switch state 66 and "off" signal switch state 62 may be signaled using one or more switches 40, each having two or more switch states 62, 66. Furthermore, it is to be understood that in the present invention, the alignment detector 48 may include multiple switches 40, each configured to signal a number of signal switch states 62, 66.

More generally, the present invention could be implemented using any type of alignment detector 48, that comprises a switch 40, a plurality of switches 40, an analog sensor 47 (e.g., a potentiometer) or a plurality of analog sensors 47, to detect and output the state of alignment of the intermediate spans 12, 13 and end span 14. The variable-speed drive controller 39 monitors the output of the corresponding alignment detector 48 and, based on the output of the alignment detector 48, selects from memory 44 and continuously furnishes to the corresponding span motor 38 a predetermined progressively increasing speed profile 75 or a predetermined progressively decreasing speed profile 77 so as to maintain substantial straight alignment of the respective longitudinal axes of the intermediate spans 12, 13 and end span 14 (as shown in FIGS. 9A, 9B, 9C and 9D).

As described above and with reference to FIG. 1B, the irrigation system 1 may include one or more variable-speed drive assemblies 35 at an intermediate tower structure 30, 31. Each variable-speed drive assembly 35 may include one or more span motors 38. A non-limiting list of suitable span motor 38 types includes a magnetic electric motor, an electrostatic electric motor, a piezoelectric electric motor, a self-commutated DC (direct current) motor, a DC SRM (switched reluctance motor), a DC variable reluctance motor, a stepper motor, an AC (alternating current) asynchronous induction motor, or an AC synchronous reluctance motor, and the like.

Figure 3B:
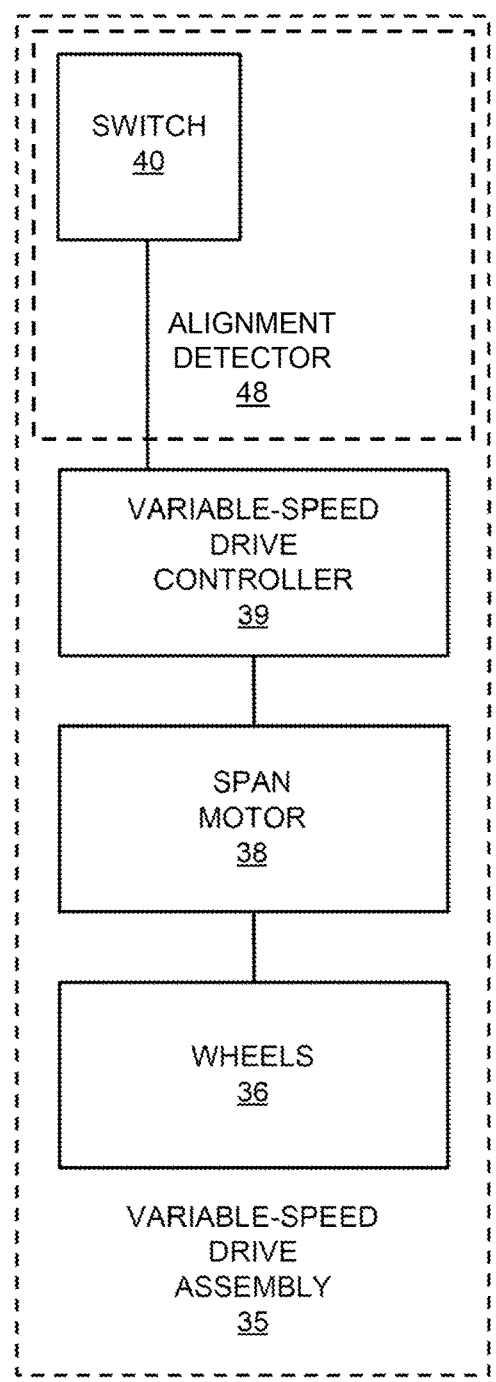
FIG. 3B is a block diagram illustrating the selected elements of the variable-speed drive assembly of the irrigation system shown in FIG. 1B in accordance with an example implementation of the present invention.

As shown in FIGS. 2B and 3B, each variable-speed drive assembly 35 may include a variable-speed drive controller 39. A non-limiting list of suitable variable-speed drive controller 39 types includes an AC (alternating current) VFD (variable frequency drive), a variable-torque V/Hz (voltsper-hertz) control VFD, a flux control VFD, a DTC (direct torque control) VFD, a sensorless vector control VFD, a sensored vector control VFD, a brush type DC (direct current) variable-drive control unit, or a DC variable-drive control unit, and the like, all with or without an internal or an external microcontroller or an internal or an external PLC (programmable logic controller).

Figure 3C:
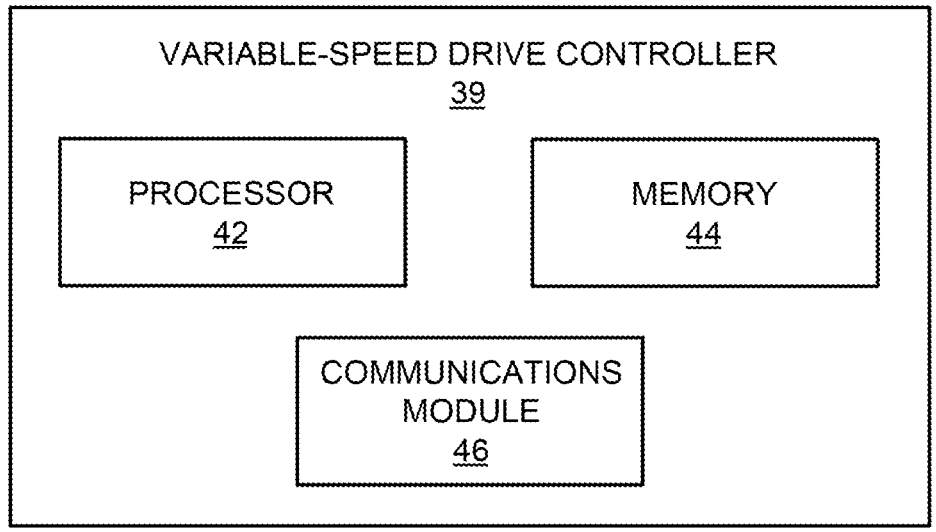
FIG. 3C is a block diagram illustrating the selected elements of the variable-speed drive controller of the irrigation system shown in FIG. 1B in accordance with an example implementation of the present invention.
Figure 3D:
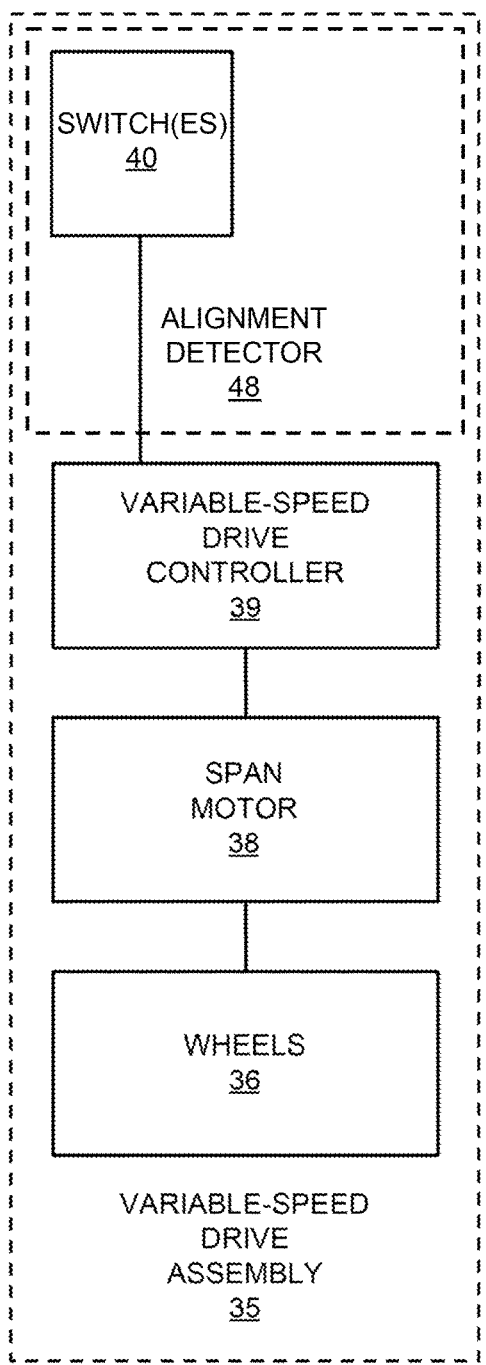
FIG. 3D is a block diagram illustrating the selected elements of the variable-speed drive assembly of the irrigation system shown in FIG. 1B in accordance with an example implementation of the present invention.

As shown in FIG. 3C, the variable-speed drive controller 39 may include a processor 42 configured to provide data processing functionality for the "on" signal switch state 66 and "off" signal switch state 62 data, respectively. Thus, the processor 42 may execute one or more control logic programs and/or instructions described herein. The variable-speed drive controller 39 may also include memory 44, which is an example of tangible computer-readable media that provides storage functionality to store various data associated with the operation of the variable-speed drive controller 39, such as software programs/modules and code segments mentioned herein, or other data to instruct the processor 42 to perform the steps described herein. Finally, the variable-speed drive controller 39 may include a communications module 46, which is configured to communicate with other components of variable-speed drive assembly 35 (e.g., span motors 38, switches 40 as in FIG. 2B) over a communication network (e.g., a wireless network, a wired network, etc.). For example, the communications module 46 of variable-speed drive controller 39 may be directly coupled (e.g., connected via one or more wires, or the like) to a corresponding switch 40 of the alignment detector 48 and to the corresponding span motor 38 of the variable-speed drive assembly 35. The communications module 46 may be representative of a variety of communication components and functionality, including, but not limited to, one or more antennas, a transmitter and/or receiver, a transceiver, or the like.

While FIG. 2B illustrates that the variable-speed drive controller 39 is incorporated inside (e.g., housed within) the variable-speed drive assembly 35, it is to be understood that the variable-speed drive controller 39 may be a standalone unit. Furthermore, the elements of processor 42, memory 44 and communications module 46 of variable-speed drive controller 39 could each be standalone and not configured to be incorporated inside (e.g., housed within) the variable-speed drive controller 39 as shown in FIG. 3C.

As shown in FIG. 3B, the variable-speed drive controller 39 may be directly connected with the respective switch 40 (e.g., via a wired connection) of the alignment detector 48. A non-limiting list of suitable switch 40 types includes a single-pole, double-throw (SPDT) switch (as illustrated by switch 40 in FIGS. 2A, 2B, 5A and 5B), a micro switch, a limit switch, a biased switch, a rotary switch, a toggle switch, a magnetic switch, a reed switch, a mercury switch, a compass switch, a photo infrared switch, a motion switch, a Hall-effect switch, a capacitance switch, an induction switch, a digital encoder switch, a position resolver switch, a guided wire switch, a GPS (global positioning system) based alignment switch, a laser based alignment switch, a non-contact proximity switch, and the like. In this implementation, the variable-speed drive controller 39 may also be directly connected to the respective span motor 38 (e.g., via a wired connection).

Figure 3E:
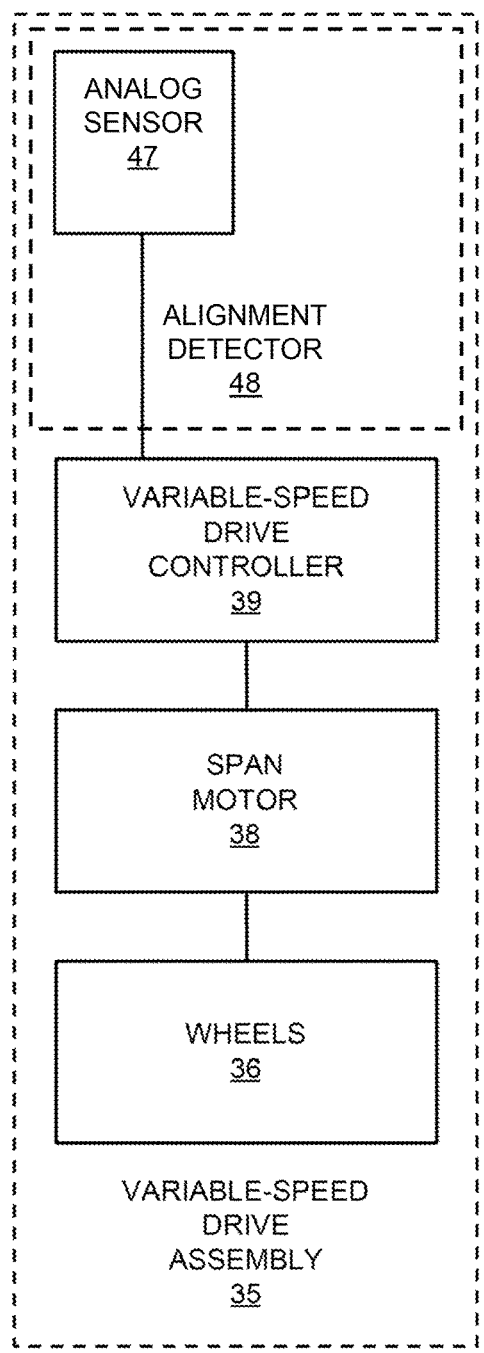
FIG. 3E is a block diagram illustrating the selected elements of the variable-speed drive assembly of the irrigation system shown in FIG. 1B in accordance with an example implementation of the present invention.
Figure 3F:
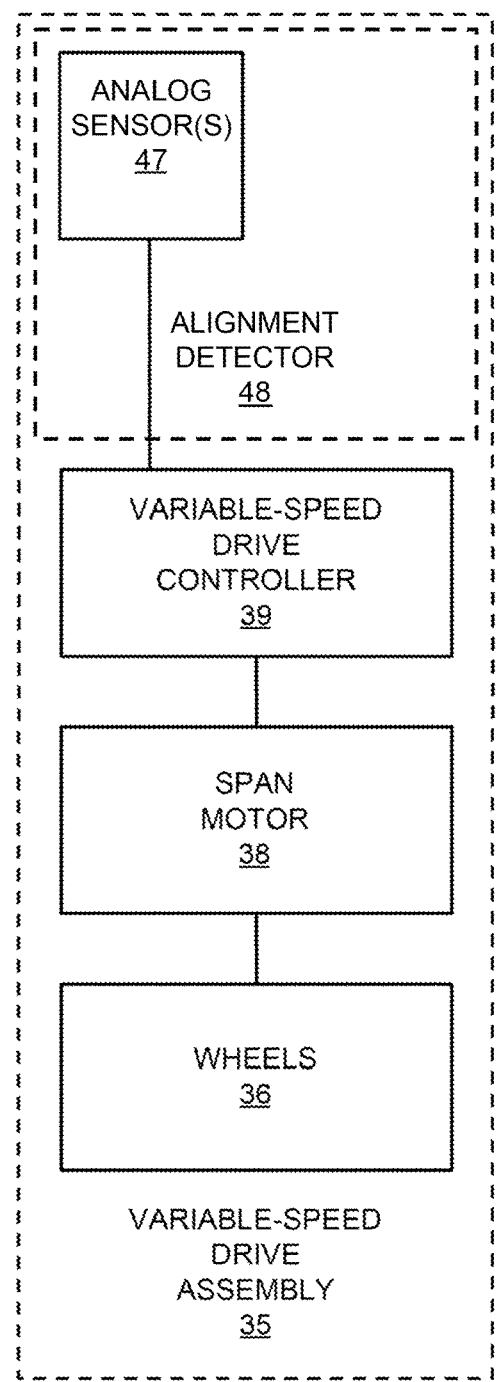
FIG. 3F is a block diagram illustrating the selected elements of the variable-speed drive assembly of the irrigation system shown in FIG. 1B in accordance with an example implementation of the present invention.

As shown in FIGS. 3E and 3F, the variable-speed drive controller 39 may be directly connected with the respective analog sensor 47 (e.g., via a wired connection) of the alignment detector 48. A non-limiting list of suitable analog sensor 47 types includes a potentiometer, a captive alignment sensor, a GPS (global positioning system) based alignment sensor, a laser based alignment sensor, a non-contact proximity sensors, or any other device capable of signaling two distinct states of alignment, and the like. In this implementation, the variable-speed drive controller 39 may also be directly connected to the respective span motor 38 (e.g., via a wired connection). In this implementation, the switch 40 may be replaced by one or more analog sensors 47 in the alignment detector 48, such alignment detector 48 may output to the variable-speed drive controller 39 either an "on" signal switch state 66 or an "off" signal switch state 62. Replacing the switch 40 with an analog sensor 47 of the alignment detector 48 may result in the analog sensor 47 being actuated by the movement of a cam 83 (similarly shown in FIGS. 2A and 2B) on a shaft connected to a corresponding rod 87 associated with a corresponding intermediate span 12, 13. The analog sensor 47 may be used, in a similar manner in comparison with switch 40, to signal either an "on" signal switch state 66 or an "off" signal switch state 62. Thus, in operation, the alignment detector 48 that includes one or more analog sensors 47 that, in-lieu-of one or more switches 40, may be configured signal the same "on" signal switch state 66 and "off" signal switch state 62 as switch 40.

Conventionally, selection of either a forward movement direction 54 or a reverse movement direction 55 by operators of irrigation system 1, using a central control panel (not shown) at center pivot point structure 2 or a remote control system (not shown) at one or more intermediate tower structures 30, 31 or end tower structure 32, determines whether the forward direction signal 22 or the reverse direction signal 23 (as shown in FIGS. 2A, 2B, 5A and 5B) is present (i.e., carrying either a forward direction signal 22 or a reverse direction signal 23 through switch 40 using normally closed switch contact 80, normally opened switch contact 81, and common switch contact 82). Either a forward direction signal 22 or a reverse direction signal 23 may result in an "on" signal switch state 66 or an "off" signal switch state 62 depending on the rotational position of cam 83 against roller-actuating arm 88 of switch 40. FIGS. 9A, 9B, 9C and 9D illustrate various switch 40 configurations that signal either an "on" signal switch state 66 or an "off" signal switch state 62 to variable-speed drive controllers 39 based on either a forward direction signal 22 or a reverse direction signal 23 and on either an opened or closed normally closed switch contact 80, an opened or closed normally opened switch contact 81, and common switch contact 82. As shown in FIGS. 2A, 2B, 5A and 5B, such switch 40 may be conventional (e.g., single-pole, double-throw (SPDT) switch also sometimes referred to as a limit switch or a micro switch).

With reference to FIGS. 2A, 4A, 4B and 4C, the alignment detector 48 may include a switch 40 with a roller-actuating arm 88 and the corresponding actuating rod 87 and cam 83 that are already included and configured in the installed base of existing electric powered irrigation systems 1. As such, the basic elements and components of the prior art can be readily used with the present invention to signal a lagging state of alignment 56, a non-lagging state of alignment 57, a leading state of alignment 58, or a non-leading state of alignment 59 between the corresponding intermediate spans 12, 13 and end span 14 for a movement direction 54, 55.

With reference to FIGS. 4A, 4B, 4C, 5A and 5B, each switch 40 when actuated or not actuated may be configured to signal when a respective intermediate span 12, 13 is in a lagging state of alignment 56, a non-lagging state of alignment 57, a leading state of alignment 58, or a non-leading state of alignment 59.

Figure 8B:
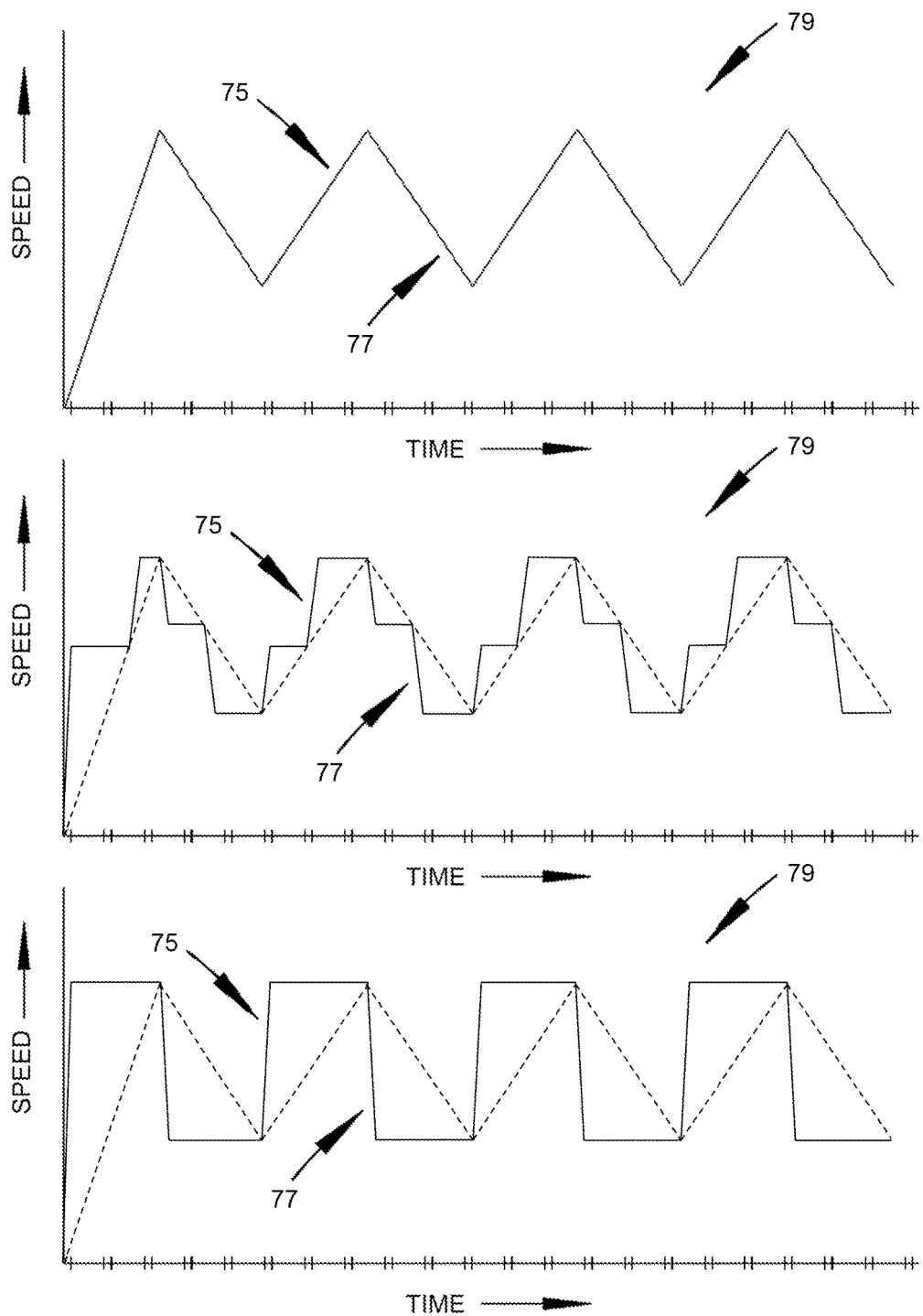
FIG. 8B are graphical diagrams illustrating transient state speeds of movement that result from alternating predetermined progressively increasing speed profiles and predetermined progressively decreasing speed profiles of the variable-speed drive controller selected from memory and continuously furnished to the corresponding span motors of the irrigation system shown in FIG. 1B in accordance with an example implementation of the present invention.
Figure 9A:
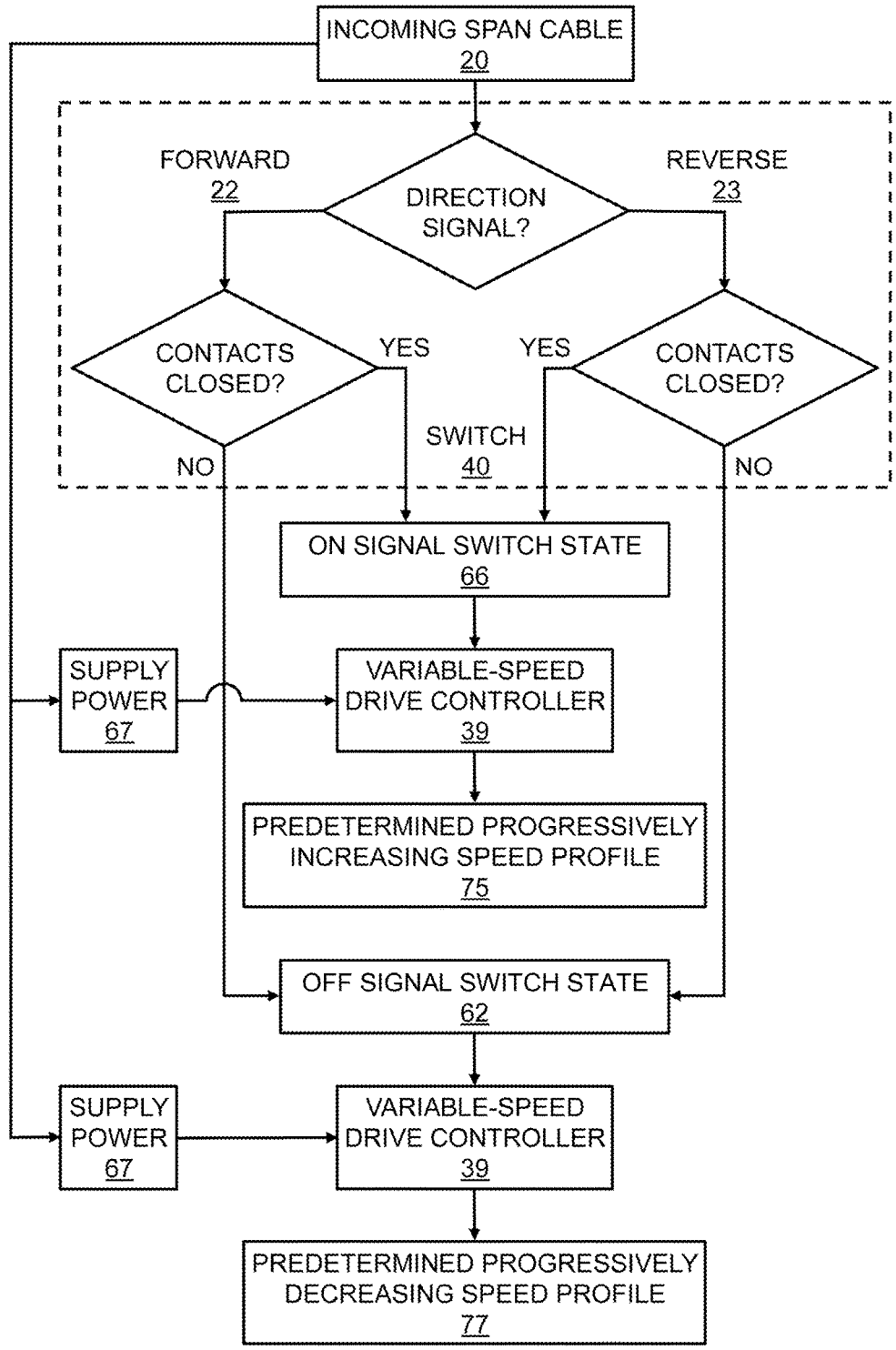
FIG. 9A is a block diagram illustrating the first of four configurations of the present invention of the irrigation system shown in FIG. 1B in accordance with an example implementation of the present invention.
Figure 9B:
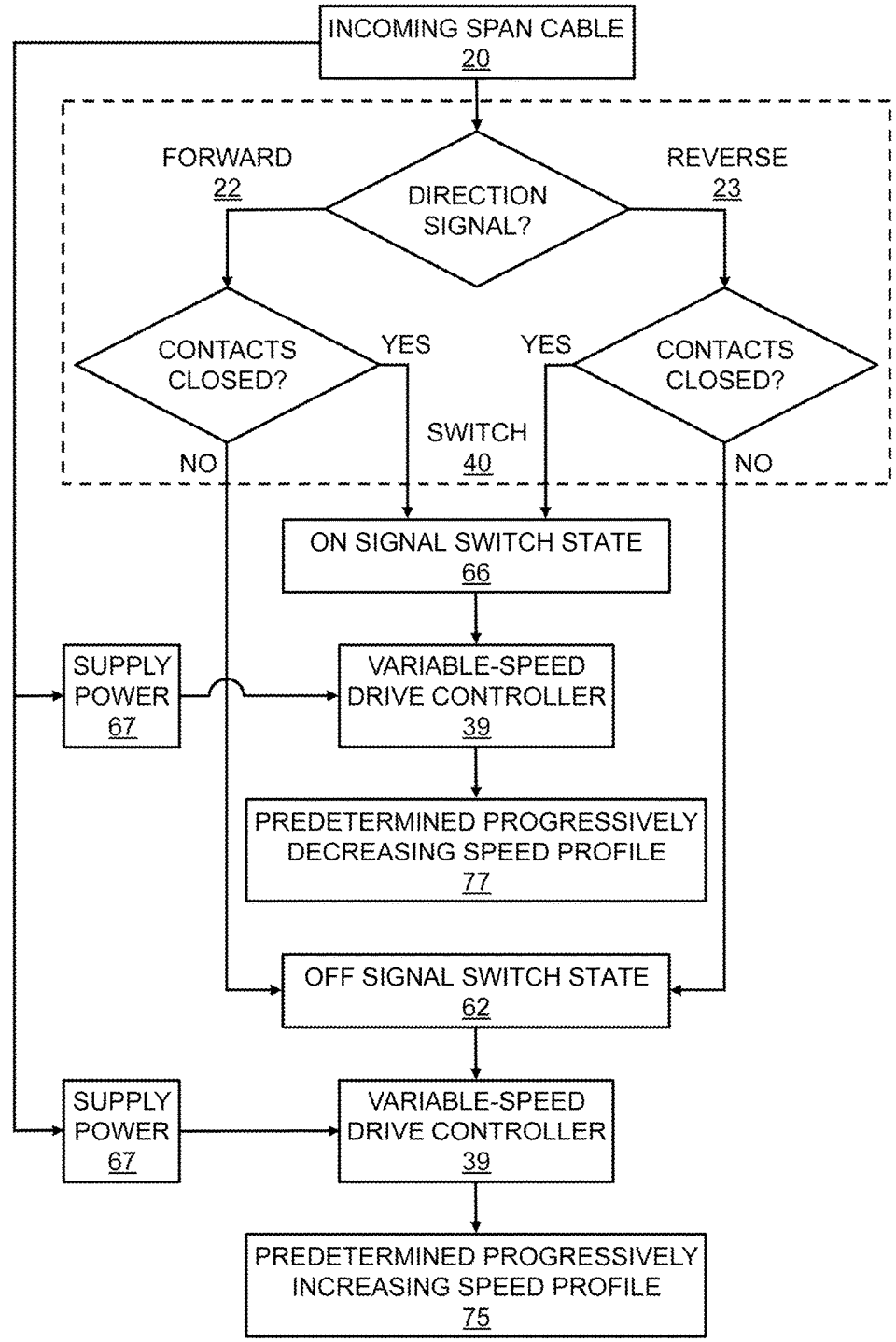
FIG. 9B is a block diagram illustrating the second of four configurations of the present invention of the irrigation system shown in FIG. 1B in accordance with an example implementation of the present invention.
Figure 9C:
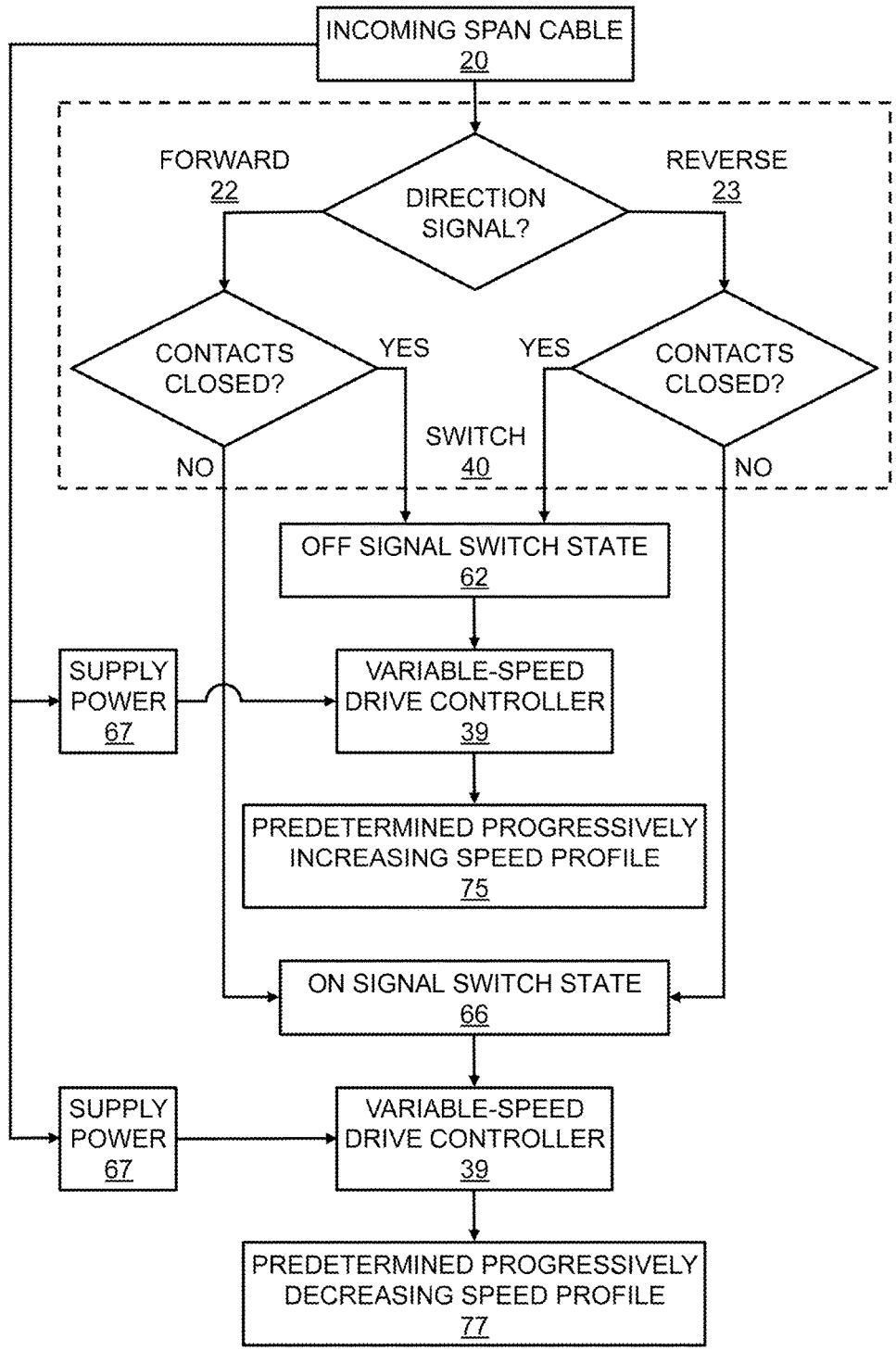
FIG. 9C is a block diagram illustrating the third of four configurations of the present invention of the irrigation system shown in FIG. 1B in accordance with an example implementation of the present invention.
Figure 9D:
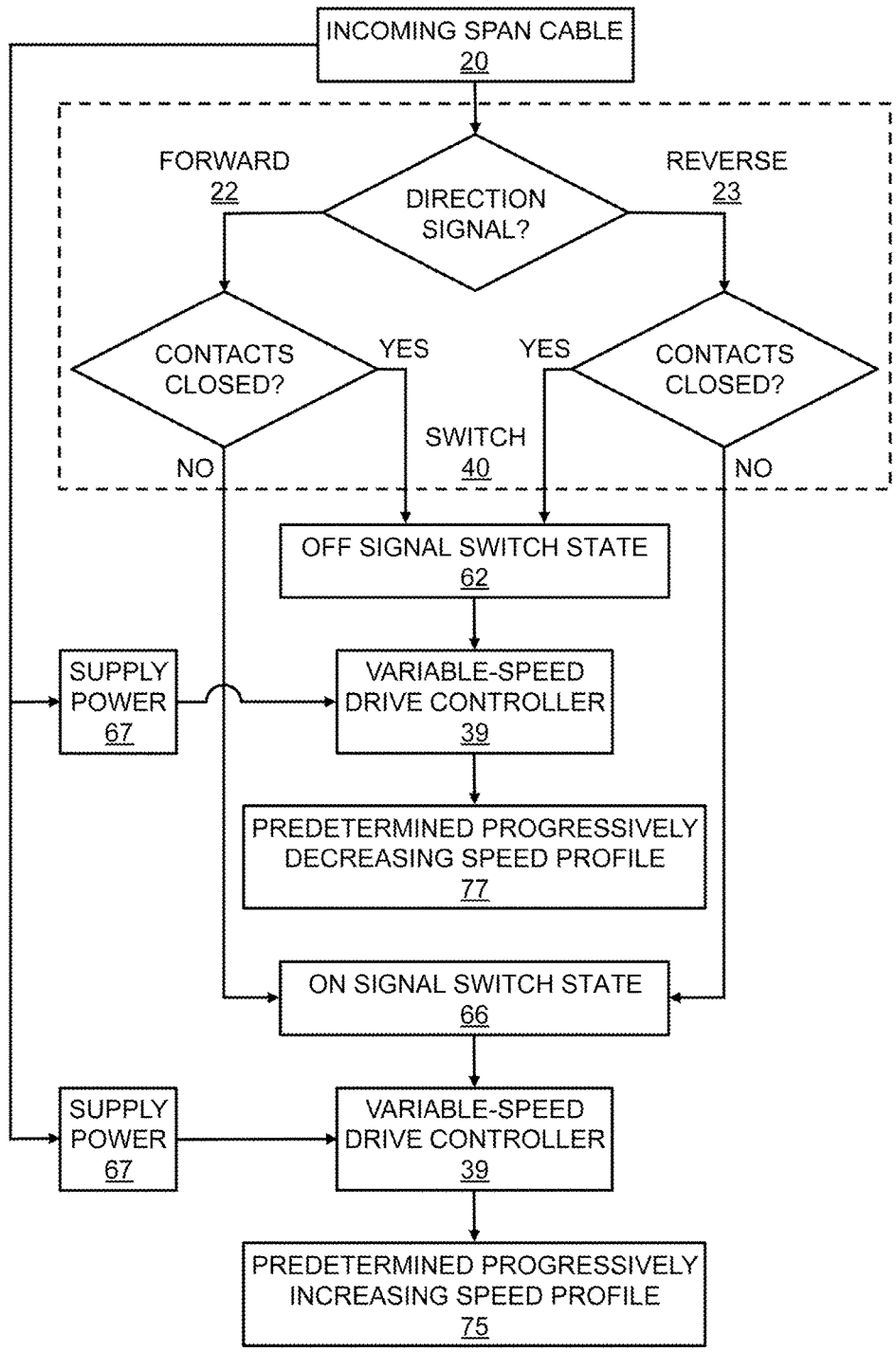
FIG. 9D is a block diagram illustrating the forth of four configurations of the present invention of the irrigation system shown in FIG. 1B in accordance with an example implementation of the present invention.

As described above and with reference to FIGS. 2B and 3B, each switch 40 is in communication with a variable-speed drive controller 39 of a variable-speed drive assembly 35 of an irrigation system 1. In response to switch 40 receiving either a forward direction signal 22 or a reverse direction signal 23 from an incoming span cable 20 (FIGS. 9A, 9B, 9C and 9D), switch 40 signals either an "on" signal switch state 66 (e.g., energized via contacts closed to allow a forward direction signal 22 or a reverse direction signal 23 from incoming span cable 20 to pass through the switch 40 to variable-speed drive controller 39) or an "off" signal switch state 62 (e.g., not energized via contacts opened to not allow a forward direction signal 22 or a reverse direction signal 23 from incoming span cable 20 to pass through the switch 40 to the variable-speed drive controller 39). The variable-speed drive controller 39, in turn, is configured to monitor and process the output of alignment detector 48 and select from memory 44 and continuously furnish to the corresponding span motor 38 a predetermined progressively increasing speed profile 75 or a predetermined progressively decreasing speed profile 77 (as determined by the processor 42 based on an "on" signal switch state 66 or an "off" signal switch state 62 as shown in FIGS. 9A, 9B, 9C, and 9D) which causes the corresponding intermediate span 12, 13 to constantly transition between a progressively increasing speed of movement over time and a progressively decreasing speed of movement over time (i.e., transient state speeds of movement 79 as shown in FIG. 8B). In contrast, FIG. 8A illustrates the repeated conventional span motor on 60 and span motor off 61 control cycles of the prior art that also result in transient state speeds of movement 79.

For example, each variable-speed drive controller 39 selects from memory 44 continuously furnishes to the corresponding span motor 38 a predetermined progressively increasing speed profile 75 or a predetermined progressively decreasing speed profile 77 as determined by the state of alignment 56, 57, 58 and 59 (FIGS. 4A, 4B and 4C) as detected and outputted by alignment detector 48 (e.g., signaled either by an "on" signal switch state 66 or an "off" signal switch state 62). Either a predetermined progressively increasing speed profile 75 or a predetermined progressively decreasing speed profile 77 is active at any one time, which serves as a means to maintain a substantial straight alignment among the adjacent intermediate spans 12, 13 and end span 14.

FIGS. 9A, 9B, 9C and 9D are example illustrations of the processes used by a switch 40, of the alignment detector 48, in both a forward movement direction 54 and in a reverse movement direction 55 to signal either an "on" signal switch state 66 or an "off" signal switch state 62. The "on" signal switch state 66 or "off" signal switch state 62 data is processed by the processor 42 of variable-speed drive controller 39. Thus, in operation, the processor 42 of the variable-speed drive controller 39 selects from memory 44 and continuously furnishes to the corresponding span motor 38 via the communications module 46 a predetermined progressively increasing speed profile 75 or a predetermined progressively decreasing speed profile 77 so as to achieve and maintain substantial straight alignment of the spans 12, 13 14 of irrigation system 1 with transient state speeds of movement 79.

Those skilled in the art will recognize that for embodiments of the present invention, the predetermined progressively increasing speed profiles 75 and the predetermined progressively decreasing speed profiles 77 may each consist of one or more rates of change in speed over time (e.g., ramp up speed, ramp down speed, step up speed, step down speed, etc.).

FIG. 8B illustrates three examples of speed profiles consisting of one or more rates of change in speed over time. The upper illustration depicts a linear, ramp up progressively increasing speed profile 75 and a linear, ramp down progressively decreasing speed profile 77. The middle illustration depicts a nonlinear, two-step up progressively increasing speed profile 75 and a nonlinear, two-step down progressively decreasing speed profile 77. The lower illustration depicts a nonlinear, one-step up progressively increasing speed profile 75 and a nonlinear, one-step down progressively decreasing speed profile 77. In all three examples, the "on" signal switch state 66 or "off" signal switch state 62 data is processed by the processor 42. In turn, the processor 42 of the variable-speed drive controller 39 of the variable-speed drive assembly 35 selects from memory 44 and continuously furnishes to the corresponding span motor 38, via the communications module 46, a predetermined progressively increasing speed profile 75 or a predetermined progressively decreasing speed profile 77 so as to achieve and maintain substantial straight alignment of the spans 12, 13 14 of irrigation system 1 with transient state speeds of movement 79. Thus, in the application of the system of the present invention, a variable-speed drive controller 39 may be configured to select from memory 44 and continuously furnish to the corresponding span motor 38 any of a plurality of predetermined progressively increasing speed profiles 75 and predetermined progressively decreasing speed profiles 77 so as to maintain substantial straight alignment of the intermediate spans 12, 13 and end span 14. Accordingly, an irrigation system with transient state speeds of movement 79 is disclosed, such system configured to maintain a substantial straight alignment of corresponding intermediate spans 12, 13 with adjacent intermediate spans 12, 13 and end span 14 with continuous movement and not the irregular motion caused by the strenuous and repetitive start-and-stop movements wherein corresponding span motors 38 are repeatedly control cycled between span motor on 60 and span motor off 61 as described in the prior art and illustrated in FIG. 8A.

Although the subject matter has been described in language specific to structural features or process operations, it is to be understood that the subject matter defined in the appended claims is not necessarily limited to the specific features or acts described above. Rather, the specific features and acts described above are disclosed as example forms of implementing the claims.

We claim:

1. An irrigation system having a movement direction over a ground surface of a field, the irrigation system comprising:
   a plurality of spans, each having a longitudinal axis, said plurality of spans being connected at a flexible juncture and having a state of alignment of the respective longitudinal axes of the plurality of spans;
   an intermediate tower structure between the plurality of spans configured to support the plurality of spans above the ground surface;
   a variable-speed drive assembly of the intermediate tower structure having a wheel configured to contact the ground surface below the irrigation system and a span motor configured to drive the wheel so as to propel the intermediate tower structure over the ground surface;
   an alignment detector of the variable-speed drive assembly configured to detect and output the state of alignment of the respective longitudinal axes of the plurality of spans indicating: (a) a lagging state of misalignment; or (b) a leading state of misalignment;

the alignment detector having:
  a switch with an arm, a normally closed switch contact, a normally opened switch contact, and a common switch contact;
  wherein the arm detects and outputs the state of alignment of the respective longitudinal axes of the plurality of spans; and
a variable-speed drive controller of the variable-speed drive assembly controlling the speed of the intermediate tower structure over the ground surface, said variable-speed drive controller monitoring and processing the output of the alignment detector and, based on the state of alignment detected by the alignment detector, increasing the speed of the span motor in the lagging state of misalignment or decreasing the speed of the span motor in the leading state of misalignment; to thereby maintain substantial straight alignment of the respective longitudinal axes of the plurality of spans.

2. The system of claim 1 wherein the variable-speed drive controller further comprises a memory storing a plurality of speed profiles that can be retrieved by the variable-speed drive controller and furnished to the span motor based on the output of the alignment detector.

3. An irrigation system having a movement direction over a ground surface of a field, the irrigation system comprising:
  a plurality of spans, each having a longitudinal axis, said plurality of spans being connected at a flexible juncture and having a state of alignment of the respective longitudinal axes of the plurality of spans;
  an intermediate tower structure between the plurality of spans configured to support the plurality of spans above the ground surface;
  a variable-speed drive assembly of the intermediate tower structure having a wheel configured to contact the ground surface below the irrigation system and a span motor configured to drive the wheel so as to propel the intermediate tower structure over the ground surface;
  a switch of the variable-speed drive assembly having a first state indicating a lagging state of alignment of the respective longitudinal axes of the plurality of spans, and a second state indicating a non-lagging state of alignment of the respective longitudinal axes of the plurality of spans;
  the switch having:
    an arm, a normally closed switch contact, a normally opened switch contact, and a common switch contact;
    wherein the arm detects and outputs the state of alignment of the respective longitudinal axes of the plurality of spans; and
  a variable-speed drive controller of the variable-speed drive assembly controlling the speed of the intermediate tower structure over the ground surface, said variable-speed drive controller increasing the speed of the span motor in the first state of the switch and decreasing the speed of the span motor in the second state of the switch, to thereby maintain substantial straight alignment of the respective longitudinal axes of the plurality of spans.

4. An irrigation system having a movement direction over a ground surface of a field, the irrigation system comprising:
  a plurality of spans, each having a longitudinal axis, said plurality of spans being connected at a flexible juncture and having a state of alignment of the respective longitudinal axes of the plurality of spans;
  an intermediate tower structure between the plurality of spans configured to support the plurality of spans above the ground surface;
  a variable-speed drive assembly of the intermediate tower structure having a wheel configured to contact the ground surface below the irrigation system and a span motor configured to drive the wheel so as to propel the intermediate tower structure over the ground surface;
  a switch of the variable-speed drive assembly having a first state indicating a non-leading state of alignment of the respective longitudinal axes of the plurality of spans, and a second state indicating a leading state of alignment of the respective longitudinal axes of the plurality of spans;
  the switch having:
    an arm, a normally closed switch contact, a normally opened switch contact, and a common switch contact;
    wherein the arm detects and outputs the state of alignment of the respective longitudinal axes of the plurality of spans; and
  a variable-speed drive controller of the variable-speed drive assembly controlling the speed of the intermediate tower structure of the ground surface, said variable-speed drive controller increasing the speed of the span motor in the first state of the switch and decreasing the speed of the span motor in the second state of the switch, to thereby maintain substantial straight alignment of the respective longitudinal axes of the plurality of spans.

* * * * *